United States Patent [19]
Alon et al.

[11] Patent Number: 5,357,528
[45] Date of Patent: Oct. 18, 1994

[54] DEPTH-2 THRESHOLD LOGIC CIRCUITS FOR LOGIC AND ARITHMETIC FUNCTIONS

[75] Inventors: Noga Alon, Tel Aviv, Israel; Jehoshua Bruck, Palo Alto, Calif.

[73] Assignee: International Business Machines Corporation, Armonk, N.Y.

[21] Appl. No.: 720,953

[22] Filed: Jun. 25, 1991

[51] Int. Cl.$^5$ .................................... G06F 11/00
[52] U.S. Cl. ........................... 371/37.9; 371/36
[58] Field of Search ............... 371/37.9, 37.6, 36

[56] References Cited

U.S. PATENT DOCUMENTS

| | | | |
|---|---|---|---|
| 3,439,328 | 4/1969 | Winder | 340/146.1 |
| 3,529,141 | 9/1970 | Reed | 235/153 |
| 3,562,502 | 2/1971 | Kautz | 235/152 |
| 3,609,329 | 9/1971 | Martin | 235/176 |
| 3,780,276 | 12/1973 | Carter et al. | 235/153 |
| 3,780,312 | 12/1973 | Lin et al. | 340/174 |
| 3,900,742 | 8/1975 | Hampel et al. | 307/205 |
| 4,964,126 | 10/1990 | Musicus et al. | 371/36 |

OTHER PUBLICATIONS

IBM Research Report On The Dynamic Range of Linear Threshold Elements, Siu & Bruck, Jan. 4, 1990, pp. 1–15.
1990 Society for Industrial and Applied Mathematics, "Harmonic Analysis of Polynomial Threshold Functions", J. Bruck, pp. 168–177.
"Threshold Circuits of Bounded Depth", Proceedings IEEE 28th FOCS, 1987, pp. 99–110, Hajnal et al.
"The CCD Neural Processor: A Neural Network Integrated Circuit with 65536 Programmable Analog Synapses" A. J. Agranat, et al. 1990 IEEE, pp. 1073–1075.
An Electrically Trainable Artifical Neural Network with 10240 "Floating Gate" Synapses, Holler et al.
Digital–Analog Hybrid Synapse Chips for Electronic Neural Networks Moopenn et al, pp. 769–776, Advances in Neural Information Processing Systems 2.
"Pulse-Firing Neural Chips for Hundreds of Neurons" Brownlow et al, pp. 785–792, Advances in Neural Information Processing Systems 2.
"A Purely Capacitive Synaptic Matrix for Fixed–Weight Neural Networks", IEEE, vol. 38, No. 2, Feb. 1991, Cilingiroglu, pp. 210–217.
"Artificial Neural Networks Using MOS Analog Multipliers" Hollis et al, IEEE, vol. 25, No. 3, Jun. 1990, pp. 849–855.

*Primary Examiner*—Vincent P. Canney
*Attorney, Agent, or Firm*—Baker, Maxham, Jester & Meador

[57] ABSTRACT

The logical comparison and arithmetic addition functions are optimally constructed in depth-2 threshold logic circuits employing majority elements arranged into structures corresponding to sparse delta polynomials. A delta polynomial is a polynomial having a relatively large value for a particular set of variable values and having a relatively small value for all other sets of variable values. A delta polynomial can be constructed through a column-by-column consideration of an error-correcting code generator matrix. The sparseness of a delta polynomial constructed in this manner means that the delta polynomial expression for implementing a threshold logic circuig which combines n-bit numbers contains no more than $n^c$ terms. A further benefit of such a delta polynomial is the low values of its coefficients.

4 Claims, 13 Drawing Sheets

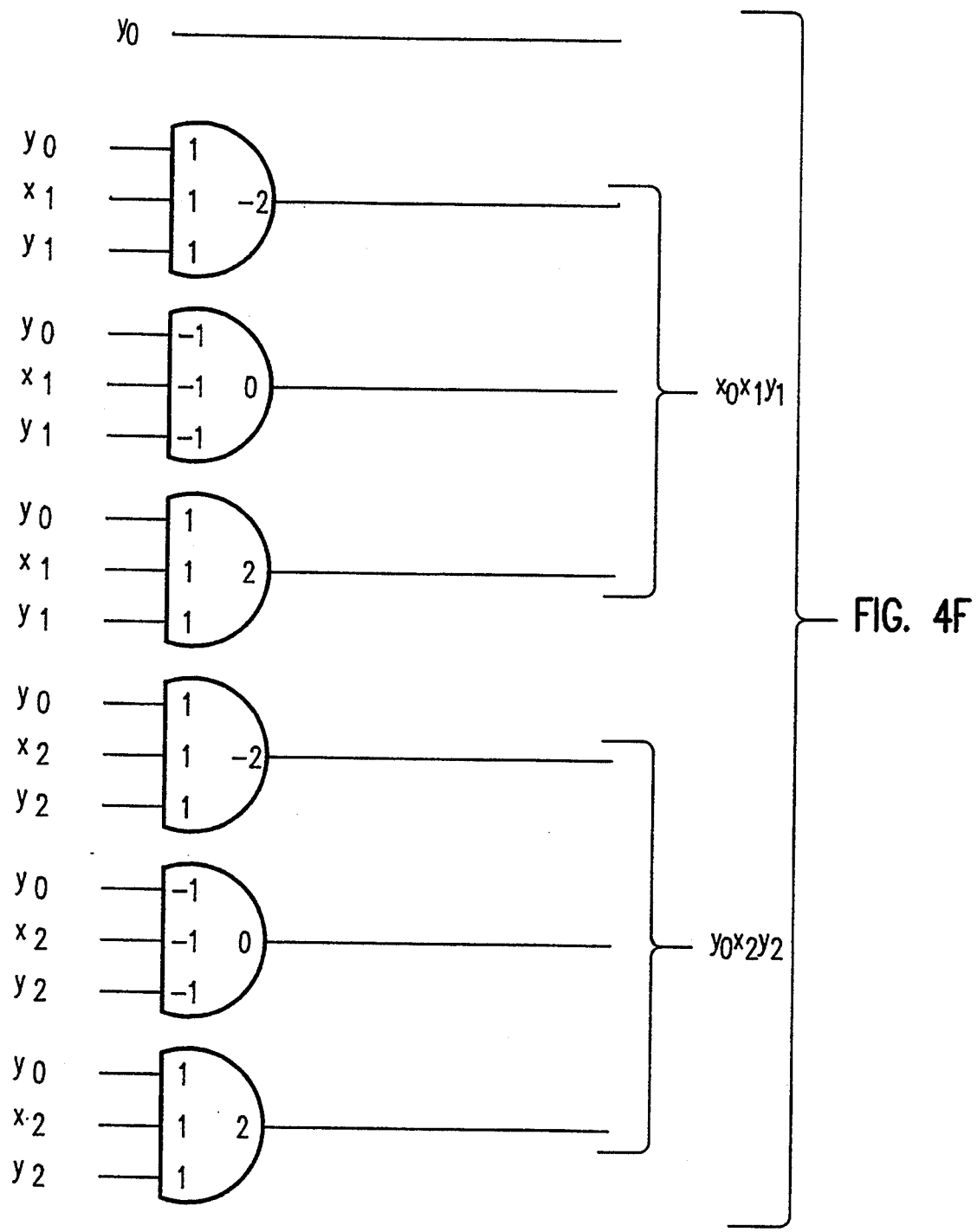

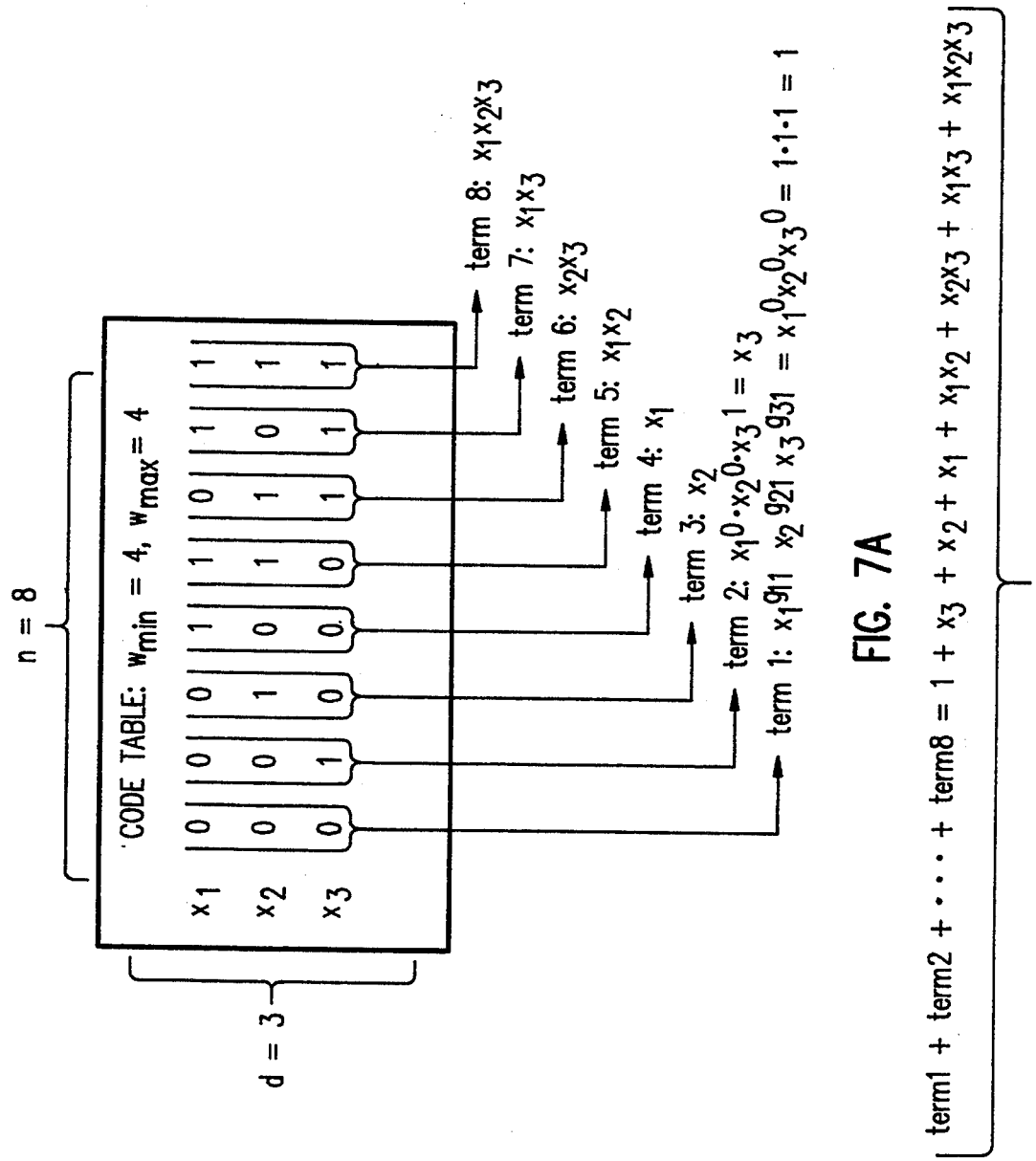

DEPTH-2 THRESHOLD LOGIC CIRCUITS FOR LOGIC AND ARITHMETIC FUNCTIONS

BACKGROUND OF THE INVENTION

The invention concerns the structure and operation of threshold logic circuits which implement the COMPARE and ADD functions.

Specialized circuits which count inputs and provide output signals indicating the relationship of the count with a predetermined threshold are known in the art. These elements are called "threshold gates". Conventionally, a threshold gate produces a binary signal (a "bit") conditioned to a first state if the sum of weighted input bits is equal to or greater than a certain value (the "threshold value"). The threshold gate conditions its output bit to the other binary value when the sum of weighted input bits is less than the threshold value.

The art recognizes a particular class of threshold gates in which a gate conditions its output according to the binary value assumed by the majority of bits input to the gate. Such gates are called "majority gates". It is known to use majority gates in order to combine variables and to sum the variables in such a manner that the summation is described by a polynomial whose terms are given by Boolean variables. In these constructions, a first level of gates receives various combinations of variables, combines them, and provides outputs representing the combinations. Following levels combine these outputs in prescribed ways, generate other outputs, and so on, until, at a last level, all outputs of the preceding level are collected by a majority gate whose output is conditioned according the function it implements. When plural level majority gate circuits are constructed to compute polynomials, the output of the last gate is referred to as the "sign" of the polynomial function. Relatedly, the circuit has a "depth" corresponding to the number of gates of the longest path from the input to the output of the circuit.

In a recent research report (K. Y. Siu and J. Bruck, "On the Dynamic Range of Linear Threshold Elements", IBM Research Report RJ 7237, January 1990), it was proved that it is possible to implement both the logical COMPARISON and ARITHMETIC addition functions in threshold circuits of depth two using majority gates. However, only the existence of the possibility was proved, with the explicit constructions of these circuits left as an open problem.

The challenge of reducing explicit constructions of the COMPARISON and ADDITION functions in depth two majority gate circuits which are described by polynomials using Boolean variables is the necessity to use exponentially large weights. This is because a polynomial used to describe the construction of such a circuit can take on widely varying values, depending upon the number of variables in the polynomial and the values to which the variables may be set by the input bits.

SUMMARY OF THE INVENTION

The invention is based on the critical realization that a certain polynomial, called a "delta polynomial", has a large absolute value for a single set of variable values and very small absolute values for all other variable value sets. In fact, a delta polynomial of Boolean variables exhibits behavior not unlike a discrete impulse or delta function. This characteristic is employed in deriving a polynomial which gives an explicit construction for the logical COMPARISON and arithmetic ADDITION functions.

A further considerable advantage is enjoyed as a result of the inventors' important observation that delta polynomials can be derived according to a procedure employing generator matrices for error-correcting codes. Such delta polynomials exhibit two important attributes: sparseness and small weights. In this regard, a sparse polynomial is one with a relatively small number of terms. Particularly, for describing the construction of depth-2 threshold logic circuits which operate on n-bit operands, delta polynomials can be derived according to the invention which have fewer than $n^c$ terms where C is a positive integer, usually less than or equal to 5. The polynomials employed to construct depth-2 threshold logic circuits according to the prior art typically exhibit $2^n$ terms. Since the number of terms of a polynomial correspond directly to the number of gates required to implement the polynomial, it is manifest that a sparse delta polynomial will provide a threshold logic circuit construction having substantially fewer gates than one constructed using a prior art polynomial.

The inventors have found that the coefficients of the terms in a sparse delta polynomial derived according to the invention are relatively smaller than those in prior art polynomials. Consequently, a threshold logic circuit whose construction is given by one or more delta polynomials will require relatively smaller weights in the majority gates which implement its functions than would be expected in the prior art. Of course, those who understand the construction of majority gates will realize that the smaller weights obtained from the delta polynomials imply less circuitry in the implementing hardware.

In this summary, and in the detailed description to follow, two kinds of notation are used. When discussing hardware, standard "computer science" notation will be employed wherein, for example, an n-bit operand X will be denoted as $X=(x_{n-1}, \ldots, x_0)$. In this notation, the bits of X range from bit $n-1$, which is the most significant, to bit 0, which is the least. When the mathematical theory of polynomials is discussed, standard polynomial notation is employed in a polynomial P having n terms is denoted as $P=(x_1 \ldots x_n)$.

The invention is found in a threshold logic circuit for combining two n-bit words $X=x_{n-1} \ldots x_0$ and $Y=y_{n-1} \ldots y_0$ according to a logic or arithmetic function. The circuit is a depth-2 structure which includes, in a first gating level, a plurality of first threshold logic gates, partitioned into respective groups, each of which responds to a respective combination of bits of X and Y for producing an output representative of a value of a respective term (monomial) in a delta polynomial function. In a second gating level, a second logic gate collects the plurality of outputs from the first logic gates and generates an output indicative of the sign function of a polynomial which is the sum of all of the delta polynomials.

A sparse delta polynomial with small weights is generated by a machine-executable procedure which employs a two-dimensional generator matrix for a binary error-correcting code in which each term of the polynomial has respective variable positions which correspond to respective rows in the generator matrix. For each column of the generator matrix, a corresponding term is produced in which each variable is assigned an exponent value identical to a value at a matrix location rc in which r is the respective row assigned to the variable and c is the column for which the term is being produced. The terms thus generated are concatenated to produce the sparse delta polynomial.

That the invention achieves the intended result and provides many other attendant advantages can be appreciated when the detailed description is read with reference to the below-described drawings.

BRIEF DESCRIPTION OF THE DRAWINGS

FIGS. 4A-4I are logic diagrams showing, in greater detail, correspondingly-labeled elements in FIG. 3.

FIGS. 7A and 7B illustrate the generation of a delta polynomial from a two-dimensional generator matrix for a linear binary error-correcting code.

DETAILED DESCRIPTION OF THE PREFERRED EMBODIMENT

Figure 1:
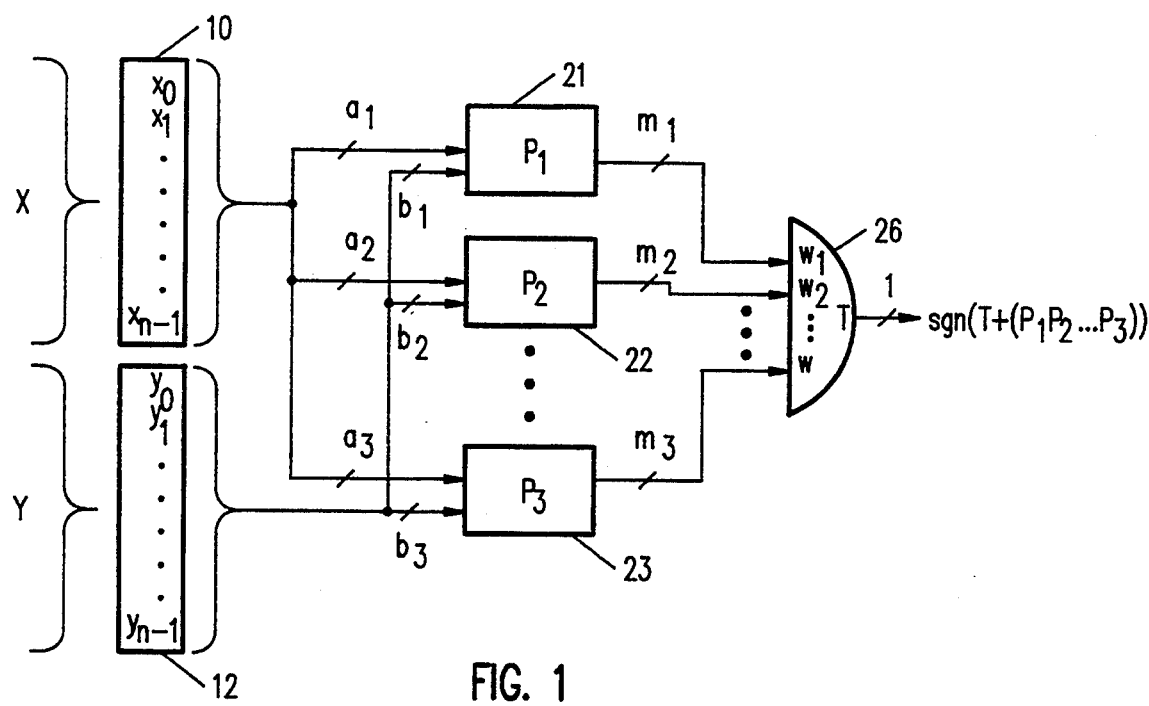
FIG. 1 is a logic block diagram illustrating a threshold logic circuit according to the invention.

In this description, all Boolean variables range over the two element set $\{-1,1\}$. This is for the purpose of significantly simplifying the descriptions of the delta polynomials upon which this invention is based. It is to be understood that the implementations described below can be in any binary technology in which the signal values assigned to the two elements will be determined by design considerations. Given n Boolean variables $x_1, \ldots, x_n$, a non-monotone MAJORITY gate (in the variables $x_i$) is a Boolean function whose value is the sign of $\Sigma \; \sigma_i x_i$, where $1 \leq i \leq n$ and each $\sigma_i$ is either 1 or $-1$. The COMPARISON function is the Boolean function of two n-bit integers X and Y whose value is $-1$ if $X \geq Y$. In the description following, there is constructed an explicit sparse polynomial whose sign computes this function. Similar polynomials are constructed for computing all the bits of the summation of the two numbers X and Y. This supplies explicit constructions of depth-2 polynomial-size circuits computing these functions, which use only non-monotone MAJORITY gates. These constructions are optimal in terms of depth and can be used to obtain the best known constructions of MAJORITY circuits for other functions like the product of two n-bit numbers and the maximum of n n-bit numbers. A crucial ingredient is the construction of a discrete version of a sparse "delta polynomial" —one that has a large absolute value for a single assignment and extremely small absolute values for all other assignments.

In the following theoretical discussion, reference will be made (by reference number) to the following publications:

[1] M. Ajtai, J. Komlos and E. Szemeredi, Deterministic simulation in LOGSPACE, Proc. 19th Annual ACM STOC, ACM Press, New York, 1987, 132-140.

[2] N. Alon, Tools from Higher Algebra, to appear in: Handbook of Combinatorics, R. L. Graham, M. Grotschel and L. Lovasz, eds., North Holland.

[3] E. Bach, Realistic analysis of some randomized algorithms, Proc. 19th Annual ACM STOC, AMC Press, New York, 1987, 453-461.

[4] B. Bollobas, Random Graphs, Academic Press, London 1985.

[5] J. Bruck, Harmonic Analysis of Polynomial Threshold Functions, SIAM J. on Disc. Math, Vol. 3, No. 7, pp. 168-177, May 1990.

[6] J. Bruck and R. Smolenski, Polynomial Threshold Functions, $AC^0$ Functions and Spectral Norms, IBM Research Report, RJ7140, November 1989.

[7] A. K. Chandra, L. Stockmeyer and U. Vishkin, Constant Depth Reducibility, SIAM J. on Comp., 13: 423-439, 1984.

[8] R. L. Graham and J. H. Spencer, A constructive solution to a tournament problem, Canad. Math. Bull. 14 (1971), 45-48.

[9] A. Hajnal, W. Maass, P. Pudlak, M. Szededy and G. Turan, Threshold Circuits of Bounded Depth, Proc. 28th IEEE FOCS, 1987, 99-110.

[10] J. Naor and M. Naor, Small-bias probability spaces: efficient constructions and applications, Proc. 22nd Annual ACM STOC, May 1990, pp. 213-223.

[11] R. Peralta, On the randomness complexity of algorithms, University of Wisconsin, Milwaukee, CS Research Report TR 90-1.

[12] W. M. Schmidt, Equations Over Finite Fields An Elementary Approach, Springer Lecture Notes in Mathematics, vol 536, Springer Verlag, Berlin 1976.

[13] K. Y. Siu and J. Bruck, On the Dynamic Range of Linear Threshold Elements, IBM Research Report, RJ7237, January 1990.

[14] I. Wegener, The Complexity of Boolean Functions, John Wiley & Sons, page 322, 1987.

[15] A. Weil, Sur les courbes algebriques et les variestes qui sen deduisent, Actualities Sci. Ind. No. 1041 (1948).

THE INVENTION

This invention concerns and solves the problem of computing the COMPARISION and ADDITION functions of two n-bit numbers using circuits of (non-monotone) MAJORITY gates. Throughout this disclosure, a Boolean function will be defined as $f:\{1,-1\}^n \rightarrow \{1,-1\}$; namely, logical 0 and logical 1 are represented by 1 and $-1$, respectively.

Definition 1: A linear threshold function f(X) is a Boolean function such that $$f(x) = \text{sgn}(F(X)) = \begin{cases} 1 \text{ if } F(X) \geq 0 \\ -1 \text{ if } F(X) < 0 \end{cases}$$

where:

$$F(X) = w_0 + \sum_{i=1}^{n} w_i x_i$$

The coefficients $w_i$ are called the weights of the threshold function. The class of linear threshold functions is denoted by $LT_1$. Notice that the weights can be arbitrary real numbers. Clearly, it is more interesting to consider the subclass of $LT_1$, called $\widehat{LT}_1$ of functions that can be written with "small" weights. Each function $$f(X) = \text{sgn}\left(w_0 + \sum_{i=1}^{n} w_i x_i\right)$$

in $\widehat{LT}_1$ is characterized by the property that the weights, $w_i$, are integers bounded by a polynomial in n. Namely, $|w_i| \leq n^c$ for some constant $c > 0$.

Of primary interest in this invention are linear threshold functions in which the weights are either 1 or $-1$. Clearly, the elements that compute those functions are non-monotone analogues of usual MAJORITY gates, which are called, for short, MAJ gates.

Definition 2: A MAJ gate computes a linear threshold function with weights which are either 1 or $-1$.

Define $MAJ_k$ to be the class of Boolean functions that can be computed by a polynomial size depth-k circuit of MAJ gates, where the depth of the circuit is the number (k) of gates on the longest path from the input to the output. Note that $MAJ_k$ is equivalent to the class $\widehat{LT}_k$, which is the class of Boolean functions that can be computed by a depth-k polynomial size circuit of linear threshold elements with polynomial weights.

After presenting the computational model, consider the functions to be computed.

Let $X = (x_n, x_{n-1}, \ldots, x_1)$ and $Y = (y_n, y_{n-1}, \ldots, y_1)$ be two vectors in $\{1, -1\}^n$. Let a and b be the integers that correspond to X and Y, respectively. Since convention preferred for this disclosure is that a logical 0 is represented by 1 and a logical 1 is represented by $-1$, this means that $$a = \sum_{i=1}^{n} ((1 - x_i)/2)2^{i-1} \text{ and}$$

$$b = \sum_{i=1}^{n} ((1 - y_i)/2)2^{i-1} \text{ and}$$

Definition 3: The COMPARISON function, C(X,Y), is a Boolean function which is $-1$ iff $a \geq b$.

Definition 4 Let $c = a + b$ and let $Z = (z_{n+1}, z_n, \ldots, z_1)$ be the binary representation of c. Then the ADDITION function is ADD(X,Y)=Z.

Why is it interesting to consider the COMPARISON and ADDITION functions?

1. It was proved in {13} that the PRODUCT of two n-bit numbers is in $MAJ_4$. However, the proof is not constructive. The construction presented herein for the ADDITION function can be used to describe explicitly a depth-4 MAJ corcuit for PRODUCT.

2. It was proved in {13} that any $LT_1$ function (one that can have large weights) is in $MAJ_3$. This proof is also not constructive. The construction presented herein for COMPARISON can be used to construct explicitly a depth-3 MAJ circuit for any $LT_1$ function.

3. The construction for COMPARISON can be used also as a building block for a depth-5 circuit for sorting of n n-bits numbers (see [7,14]).

It is known [7,14] that COMPARISON $\in MAJ_3$ and ADDITION $\in MAJ_4$. It was also observed in [13] that COMPARISON $\in LT_1$, namely, the COMPARISON function can be computed by a single linear threshold element. However, this linear threshold element has exponentially big weights. As shown in [13] COMPARISON$\in\widehat{LT}_1$. On the other hand, using the results in [6], it was proved in [13] that both COMPARISON and ADDITION are in $MAJ_2$. However, the proofs in [13] are just existence proofs and the problem of finding explicit constructions was left as an open problem, which are solved with this invention.

The main contributions made by this invention are explicit constructions of depth-2 polynomial size circuits of MAJ gates that compute the COMPARISON and ADDITION functions. It is shown below that the COMPARISON and ADDITION functions can be computed as sign functions of explicit sparse polynomials (i.e., polynomials with $n^{O(1)}$ monomials and with 1,-1-coefficients). In [5], it is proved that any function that can be computed as a sign of such a polynomial is also in $MAJ_2$. Hence, the COMPARISON and ADDITION functions are in $MAJ_2$. The key to the construction is the idea that sparse polynomials can be constructed that have a property of a "discrete delta function" in the sense that the value of the polynomial is very large for X being the all-1 vector and extremely small for all other values. The construction of these polynomials, that are called delta polynomials, is presented below. Then, the delta polynomials are used as building blocks in the construction of depth-2 MAJ circuits for the COMPARISON and ADDITION functions. These constructions can be practical, as they may be used in the actual design of small depth circuits for addition and multiplication based on MAJ gates.

Character Sums and Delta Polynomials

It is known how to construct linear error correcting codes having minimum and maximum weights which are approximately equal to n/2. One way employs properties of the quadratic residue character. The inventors employ the same methods to construct sparse delta polynomials. See the discussion below for a general method for constructing sparse delta polynomials from linear error correcting codes.

Let $x_1, \ldots, x_n$ be n variables, where each $x_i$ ranges over the two-element set $\{-1,1\}$. Since $(x_i)^2 = 1$ for all i, every polynomial in the variables $x_i$ can be represented as a multilinear polynomial. Thus a monomial is defined in the variables $x_i$ to be a product of a subset of the set of variables with a coefficient $+1$ or $-1$, i.e., a product of the form $\sigma_j \pi_{i \in A} x_i$, where $\sigma_j \in \{-1,1\}$ and A $\subset \{1, \ldots, n\}$.

A polynomial in the variables $x_i$ above is called t-sparse if it is the sum of at most t monomials. Of greatest interest is the case that t is at most $n^{O(1)}$.

For a vector $\sigma = \{\sigma_1, \ldots, \sigma_n\}$, where $\sigma_i \in \{-1,1\}$, and for a positive real c, a polynomial $P(x_1, \ldots, x_n)$ is called a delta polynomial for $\sigma$ and c if there are two positive constants a and b satisfying $(a/b) \geq c$ such that:
(i) $P(\sigma_i, \ldots, \sigma_n) = a$ and
(ii) For all $(x_i, \ldots, x_n) \in \{-1,1\}^n$ which satisfies $(x_i, \ldots, x_n) \neq \sigma$, $|P(x_i, \ldots, x_n)| \leq b$.

Therefore, P is a delta polynomial for $\sigma$ and c if it attains a positive value at $\sigma$ and the absolute value of P on any other point in $\{-1,1\}^n$ is smaller by at least a factor of c.

Observe that the polynomial $\pi(1 + x_i)$ where $1 \leq i \leq$ is a delta polynomial for $(1,1, \ldots, 1)$ and any positive c. However, this polynomial is a sum of exponentially many monomials. Our objective in this section is to construct explicitly relatively sparse delta polynomials.

The existence of such polynomials follows from the results of [13], but their explicit construction seems to be more difficult.

One can easily check that if $P(x_1, \ldots, x_n)$ is a delta polynomial for $(1,1,\ldots,1)$ and c then for any vector $(\sigma_1, \ldots, \sigma_n) \in \{-1,1\}^n, P(\sigma_1 x_1, \ldots, \sigma_n x_n)$ is a delta polynomial for $\sigma$ and c, which has exactly the same number of monomials as P. Thus, attention may be restricted to the construction of sparse delta polynomials for $(1,1,\ldots,1)$.

This construction is based on the properties of the quadratic residue character which are proved using Weil's famous theorem known as the Riemann hypothesis for curves over finite fields. These properties have been used before to derive the pseudo-random properties of Paley graphs and quadratic tournaments, and have also been used in the analysis of certain randomized algorithms for various number-theoretic problems. Another construction can be given based on some of the ideas of [1] and [10] and the known constructions of expander graphs. For the purposes of this invention, the quadratic residue construction is slightly better and only this construction is described.

Let q be an odd prime power and let $\beta$ be the quadratic residue character defined on the elements of the finite field GF(q) by $\beta(y) = y^{(q-1)/2}$. Equivalently, $\beta(y)$ is 1 if y is a non-zero square, 0 if y is 0 and $-1$ otherwise. Suppose $q \geq n$ and let $B = \{b_1, \ldots b_n\}$ be an arbitrary subset of cardinality n of GF(q). Consider the following polynomial in the n variables $x_1, \ldots, x_n$:

$$P_B(x_1, \ldots, x_n) = \sum_{y \in GF(q) \setminus B} \prod_{i=1}^{n} (1 + \beta(y - b_i) + x_i(1 - \beta(y - b_i)))/2$$

Observe that $P_B$ is a sum of exactly $q-n$ monomials, since for each fixed y in $GF(q)\setminus B$, the quantity $(1+\beta(y-b_i)+x_i(1-\beta(y-b_i)))/2$ is either 1 or $x_i$.

Therorem 1 For every odd prime power q and for every subset B of cardinality n of GF(q), the polynomial $P_B$ defined above satisfies:
(i) $P_B(1,1,\ldots,1) = q-n$, and
(ii) For every $(x_1, \ldots x_n) \in \{-1,1\}^n$ which is not $(1,1,\ldots,1)$, $|P_B(x_1, \ldots, x_n)| \leq (n-1)q^{\frac{1}{2}}$.

Therefore, $P_B$ is a $(q-n)$-sparse delta polynomial for $(1,1,\ldots,1)$ and $c = (q-n)/(n-1)q^{\frac{1}{2}}$.

Notice that when q is a prime and B is simply the set $\{1,2,\ldots n\}$, the expression for the polynomial $P_B$ is relatively simple.

In order to prove Theorem 1, the following known estimate for character sums is necessary:

Lemma 1 Let F be the field GF(q) and let $\beta$ be a character of order $d > 1$. Suppose that f(y) is a polynomial over F with precisely m distinct zeros which is not a dth power, i.e., it cannot be expressed as $c(g(y))^d$ where $c \in F$ and where g(y) is a polynomial over F. Then $$\left| \sum_{y \in F} \beta(f(y)) \right| \leq (m-1) q^{\frac{1}{2}}$$

Proof of Theorem 1: Since $P_B$ is a sum of $q-n$ monomials it is $(q-n)$-sparse. Moreover, since the coefficient of every monomial is 1, it follows that $P_B(1,1,\ldots,1) = q-n$. Suppose, now, that $(x_1, \ldots, x_n) \neq (1,1,\ldots,1)$ is a vector in $\{-1,1\}^n$. Put $I = \{i: 1 \leq i \leq n, x_i = -1\}$, $J = \{b_i : i \in I\}$. By substituting the values of the variables $x_i$ and by the fact that the quadratic character is multiplicative, the following is obtained:

$$\prod_{i=1}^{n} (1 + \beta(y - b_i) + x_i(1 - \chi(y - b_i)))/2 =$$

$$\prod_{i \in I} \beta(y - b_i) = \beta\left(\prod_{i \in I} \beta(y - b_i)\right).$$

Define $f(y) = \prod_{i \in I}(y - b_i)$. Observe that for the quadratic character $\beta$, $\beta(f(y)) = 0$ whenever y is equal to one of the elements $b_i$ for $i \in I$. Therefore:

$$P_B(x_1, \ldots, x_n) =$$

$$\sum_{y \in GF(q) \setminus B} \prod_{i=1}^{n} 1 + \beta(y - b_i) + x_i(1 - \beta(y - b_i))/2$$

$$= \sum_{y \in GF(q) \setminus B} \beta(f(y))$$

$$= \sum_{y \in GF(q) \setminus (B \setminus J)} \beta(f(y))$$

$$= \sum_{y \in GF(q)} \beta(f(y)) - \sum_{y \in B \setminus J} \beta(f(y))$$

Observe that since I is not empty and since the elements $b_i$ are distinct f(y) is not a square. Therefore, Lemma 1 can be applied to obtain, by the triangle inequality:

$$|P_B(x_1, \ldots, x_n)| \leq \left| \sum_{y \in GF(q)} \beta(f(y)) \right| +$$

$$\left| \sum_{y \in B \setminus J} \beta(f(y)) \right| \leq (|I| - 1)q^{\frac{1}{2}} + n - |I|$$

The quantity $(|I|-1)q^{\frac{1}{2}}+n-|I|$ is clearly an increasing function of $|I|$, and since $|I| \leq n$ this quantity is at most $(n-1)q^{\frac{1}{2}}$. This completes the proof.

The Constructions

In this section, it is proved that the COMPARISION and ADDITION functions can be computed as sign functions of (explicit) sparse polynomials. From a result in [5], this implies that both functions can be computed by an explicit depth-2, polynomial size circuit of MAJ elements. Both constructions apply the delta polynomials described in the previous section.

First, note that the following is an equivalent description of the COMPARISON function: For $X, Y \in \{1, -1\}^n$, $C(X, Y) = -1$ if either $X = Y$ or there exists an i, $1 \leq i \leq n$ such that $x_i = -1$ and $y_i = 1$ and also $x_j = y_j$ for all j, such that $i < j \leq n$. The following theorem gives the construction for the logical COMPARISON function.

Theorem 2: Let $m_k(X,Y) = P(x_n y_n, x_{n-1}, \ldots, x_{k+1} y_{k+1})$ and let $m_n(X,Y) = q-n$, where $P(.)$ is the delta polynomial described in Theorem 1 with $q \geq n^4$ an odd prime power. Define:

$$\hat{C}(X, Y) = m_0(X, Y) + \sum_{i=1}^{n} (y_i - x_i)m_i(X, Y).$$

Then $C(X,Y)=\text{sgn}(-\hat{C}(X,Y))$.

Proof: Consider the two cases ($X \geq Y$ or $X < Y$) and prove that $C(X,Y)=\text{sgn}(-\hat{C}((X,Y))$ in both cases.

First assume that X is strictly greater than Y. Hence, there is an i such that $x_i=-1$ and $y_i=1$ and also $x_j=y_j$ for all j, $i<j\leq n$. Hence, $(y_i-x_i)m_i \geq 2(q-n)$ and $$\hat{C}(X, Y) \geq 2(q - n) - 2n(n - 1)\sqrt{q} > 0.$$

If $X=Y$, then clearly $\hat{C}(X,Y)=q-n>0$. Hence, if $X \geq Y$ then $-1=C(X,Y)=\text{sgn}(-\hat{C}(X,Y))$.

Similarly, if $X<Y$ then $\hat{C}(X,Y) \leq -2(q-n+2n(n-1)\sqrt{q}<0$. Hence, $C(X,Y)=\text{sgn}(-\hat{C}(X,Y))$ in this case as well, completing the proof.

Next, consider the ADDITION function. In order to compute the bits of the sum of the two n-bit numbers x and Y as signs of sparse polynomials, it suffices to construct a sparse polynomial for each of the carry bits. This is because the ith bit in the result of the addition is $x_i y_i c_i$ where $c_i$ is the corresponding carry bit. If $c_i$ can be computed as a sign of a sparse polynomial, say $c_i=\text{sgn}(p(X,Y))$, then it is also possible to compute $x_i y_i c_i=\text{sgn}(x_i y_i p(X,Y))$ as a sign function of a sparse polynomial. From now on, attention will be given, without loss of generality, to proving that the carry to the last bit (i.e., $c_n$) can be computed as a sign of a sparse polynomial. Denote the carry function to the last bit as CAR(X,Y) and prove that it can be computed as a sign function of a sparse polynomial.

Theorem 3: Let $1_k(X,Y)=P(-x_{n-1}y_{n-1}, -x_{n-2}y_{n-2}, \ldots, -x_{k+1}y_{k+1})$ and let $1_{n-1}(X,Y)=q-n$, where $P(.)$ is the delta polynomial described in Theorem 1 with $q \geq 4n^4$ an odd prime power. Let $f1(w_1,w_2)=(1-w_1-w_2+w_1w_2)$. Let $$\widehat{CAR}(X, Y) = \sum_{i=1}^{n-1} f_1(x_1, y_i)l_i(X, Y)$$

then $CAR(X, Y) = \text{sgn}(2q - \widehat{CAR}(X, Y))$.

Proof: Note that $f_1(-1, -1) = 4$ and $$f_1(1, 1) = f_1(1, -1) = f_1(-1, 1) = 0.$$

First, assume that there is carry to bit n in the addition of X and Y, namely, that $CAR(X,Y)=-1$. In such a case, carry generation and propagation are both active. Namely, there is an $i<n$ such that $x_i=-1$ and $y_i=-1$ in which the carry is generated, and in addition $x_j \neq y_j$ for all j, $i<j<n$ (so that the carry will propagate). Note that the carry will propagate also in the case $x_j=y_j=-1$. However, without loss of generality, consider the leftmost place i in which the carry was generated. Since $f_i(x_i,y_i)1_i \geq 4(q-n)$ then, by the properties of the delta polynomials, $$\widehat{CAR}(X, Y) \geq 4(q - n) - 4(n - 2)(n - 1)\sqrt{q} > 2q$$

Hence, if there is carry, then $CAR(X,Y)=\text{sgn}(2q-\widehat{CAR}(X,Y))$.

Next, consider the case in which there is no carry. The reason for not having a carry is that for each index i either there is no carry generation (and then $f_i(x_i,y_i)=0$) or there is a carry generation but there is no carry propagation. In the latter case, $|1_i(X,Y)| \leq (n-1)\sqrt{q}$. Hence, for this case $$\widehat{CAR}(X, Y) \leq 4(n - 1)^2 \sqrt{q} < 2q$$

Hence, if there is no carry, then $CAR(X,Y)=\text{sgn}(2q-\widehat{CAR}(X,Y))$, completing the proof.

OBSERVATIONS

A family of vectors F in $\{-1,1\}^n$ is a linear subspace if for every $x=(x_1, \ldots, x_n)$ and $y=(y_1, \ldots, y_n)$ in F, the vector $x*y=(x_1y_1, \ldots, x_ny_n)$ is also in F. (This is the usual definition of a subspace together with the mapping that replaces 0 and 1 by 1 and $-1$, respectively.)

Similarly, A is an affine subspace if it is the set of all vectors of the form $x*y$ for some fixed vector x as y ranges over all vectors of a linear subspace. Generalizing the notion of a delta polynomial, one can construct, for every affine subspace a sparse polynomial whose value on the members of the subspace is much larger than whose value on vectors outside the subspace. (The delta polynomials correspond to the case that the subspace contains only one point). This permits, among other things, the explicit expression of every function, which is the characteristic function of a union of polynomially many affine subspaces as a sign of a sparse polynomial. In order to construct the generalized delta polynomials, observe first that it suffices to construct those for linear subspaces. For every linear subspace of co-dimension k in $\{-1,1\}^n$, there are k monomials in $x_l, \ldots, x_n$ such that a vector $(x_h, \ldots, x_n)$ is in the subspace if all these monomials evaluated in the coordinates of the above vector are 1. Thus, one can simply substitute these monomials in the delta polynomial and obtain the desired generalized sparse polynomial.

The delta polynomials supply an immediate way of expressing any Boolean function that can be computed by a depth-2 polynomial size monotone circuit as a sign of a sparse polynomial.

By a non-constructive argument, one can prove that there is a (q−n)-sparse polynomial $P(x_l, \ldots, x_n)$ satisfying somewhat stronger properties than those given by Theorem 1; namely, (i) $P(1,1, \ldots, 1)=q-n$, and (ii) For every $(x_1, \ldots x_n) \in \{-1,1\}^n$ which is not $(1,1, \ldots, 1)$, $|P(x_1, \ldots, x_n)| \leq O(n^{\frac{1}{2}}q^{\frac{1}{2}})$.

INDUSTRIAL IMPLEMENTATIONS

Refer now to the figures in which industrial implementations of the COMPARISON and ADDITION functions are illustrated. In FIG. 1, a threshold logic circuit for combining two n-bit words to perform a logic function using the delta polynomial construction described above is shown. The word X is provided from a register 10 and includes, in order from most to least significant, bits $x_{n-1}$ thru $x_0$. The word Y in register 12 includes bits $y_{n-1}$ thru $y_0$, in decreasing significance order. The bits of X and Y are provided, in respective combinations, to logic gate groups 20, 21, and 24. Each logic gate group includes a plurality of threshold logic gates which combine the respective group bits according to a respective delta polynomial. Each of the logic gate groups provides a set of outputs, each output corresponding to a respective monomial of the delta polynomial underpinning the construction of the logic gate group which produces the outputs. Thus, the group of threshold logic gates 20 is constructed according to a delta polynomial $P_1$ which includes $m_1$ monomials. Each of these monomials is of a degree of 1 or greater, in that it combines 1 or more bits of X and/or Y. The monomials which combine two or more bits are implemented in threshold logic gates, each gate producing an output with the value contained in $[-1,1]$. The single-degree monomials may be merely hard-wired pass-throughs of the single bits to which they correspond. The outputs of the logic gate groups 21, 22, and 23 are provided to the threshold gate 26. The outputs of each logic gate group are equally weighted at the input of the threshold gate 26. Thus, each of the $m_2$ outputs generated by the logic gate 22 is weighted by the value $w_2$ at the input to the threshold gate 26. The threshold gate 26 combines the weighted inputs, applies them to a threshold value T and generates a single output which is set to 1 if the combination of the threshold value T and the weighted inputs equals or exceeds 0, and to $-1$ if less than 0. Those skilled in the art will appreciate that the output of the threshold gate 26 is essentially the sign function of a polynomial including T plus the union of the delta polynomials embodied in the logic circuit groups 21 et al.

Figure 2A:
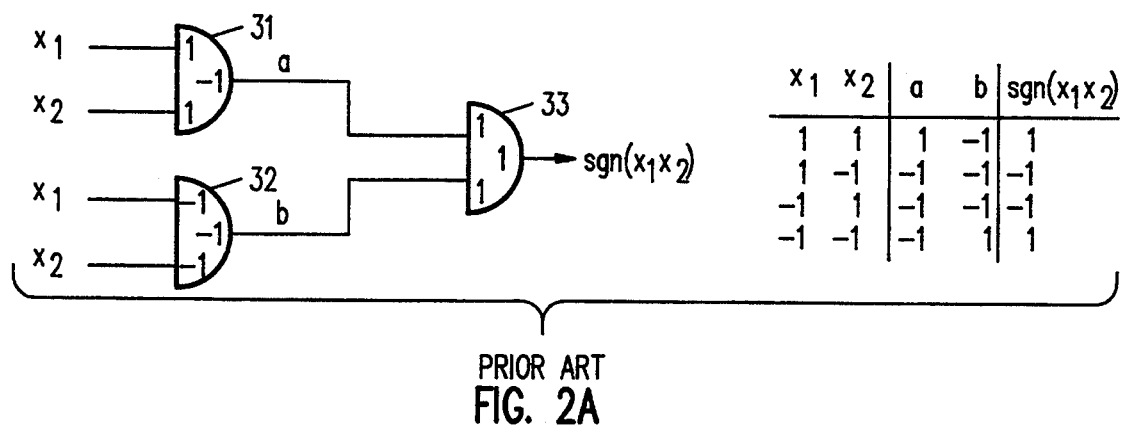
FIGS. 2A and 2B are each include logic and logic state diagrams illustrating implementation of a monomial in a threshold logic circuit.
Figure 2B:
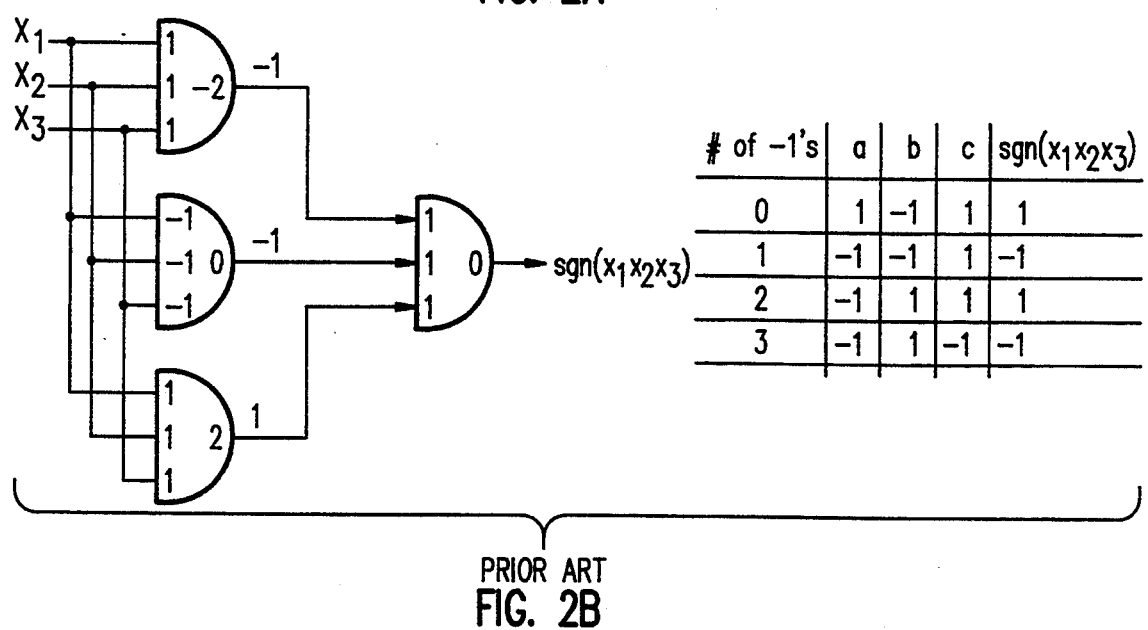

In preparation for an example showing implementation of the COMPARISON function, refer to FIGS. 2A and 2B for an understanding of how two particular monomials which correspond to polynomial terms are implemented in the prior art. In FIG. 2A, the sign function of two variables, $x_1$ and $x_2$, is implemented in a depth-2 circuit including a first level of threshold gates 31 and 32, and a second level including a threshold gate 33. The outputs, a and b, of the first level gates 31 and 32 are provided as inputs to the second level gate 33. The output of the gate 33 is the sign function $\text{sgn}(x_1 x_2)$. The table for all values of the inputs is included in the figure. A depth-2 arrangement of threshold gates is shown in FIG. 2B for combining three variables.

Once the significance of delta polynomials in the design of threshold logic circuits is appreciated, those skilled in the art will appreciate that the circuits illustrated in FIGS. 2A and 2B point the way to implementing the monomials included in the delta polynomial. In this regard, a monomial corresponds essentially to a term of the polynomial. A monomial may be of degree 1 or greater, with a monomial of degree 1 being represented by, for example, $x_1$ and one of degree 2 by, for example, $x_1 x_2$. The implementation of a delta polynomial such as the polynomial $P(x_1,x_2) = \frac{1}{4}(1 + x_1 + x_2 + x_1 x_2)$ in a threshold logic circuit requires generation of a value for the monomial $x_1 x_2$. This provision is inherent in the gates 31 and 32 of FIG. 2A. In the case of the delta polynomial $P(x_1,x_2)$, the inputs to the gate 33 would be expanded to receive the monomials $x_1$ and $x_2$ directly, the weight at each input would be $\frac{1}{4}$, and the threshold would remain $T=1$.

IMPLEMENTATION OF THE COMPARISON FUNCTION

Consider now the constructive expression of the logical COMPARISON function as given in equation (1), wherein:

$$C(X, Y) = \text{sgn}\left(-m_{-1}(X, Y) + \sum_{i=0}^{n-1} (x_i - y_i) m_i(X, Y)\right) \quad (1)$$

where:

$$m_{-1}(X, Y) = P(x_{n-1} y_{n-1}, \ldots, x_0 y_0) \quad (2)$$

$$m_i(X, Y) = P(x_{n-1} y_{n-1}, \ldots x_{i+1}, y_{i+1}) \quad (3)$$

$$m_{n-1}(X, Y) = 1 \quad (4)$$

In equations (1)–(4), each of the m terms represents a delta polynomial P which has the property that $P(X)=1$ in the case that the vector X equals $(1,1,\ldots,1)$ and $=0$ for all other assignments of the vector X. In the construction of equation (1), each delta polynomial combines components of X and Y to test all of the conditions which are necessary and sufficient to determine if X is greater than or equal to Y, in which case the sign function of equation (1) will equal $-1$, or if X is less than Y, in which case the sign function will equal 1.

The delta polynomial of equation (2) tests each pair of corresponding bits in X and Y to determine whether they are equal. If $X=Y$, every term (monomial) of equation (2) will have a value of 1 and $m_{-1}(X,Y)$ will equal $(1,1,\ldots,1)$. In this case, each delta polynomial denoted by $m_i$ will be multiplied by $(y_i - x_i)$ which will be equal to zero at every bit position. Thus, when $X=Y$, the term in equation (1) represented by $-m_{-1}$ is equal to $-1$, all other terms are equal to 0, and the sign function is equal to $-1$.

The other condition to be tested is whether X is greater than Y, which is done by the delta polynomials represented by equations (3) and (4). For equation (3), one of the delta polynomials $m_i(X,Y)$ will be equal to 1 if, and only if, $x_k = y_k$ for every k greater than i and less than or equal to $n-1$. If such a i exists, then $C(X,Y)$ is equal to $\text{sgn}(x_i - y_i)$. Now, if $x_i$ is greater than $y_i$, $x_i$ will equal $-1$, while $y_i$ will equal 1, and:

$$C(X,Y) = \text{sgn}(-1-1) = \text{sgn}(-2) = -1$$

If X is less than Y, then all of the delta polynomials given by equations (2) and (3) will be 0. If, in this case, X is equal to Y in every bit position save the most significant, the term $x_{n-1} - y_{n-1}$ will be equal to 2 which is multiplied by the value of 1 for the delta polynomial $m_{n-1}$. In this case, equation (1) reduces to:

$$C(X,Y) = \text{sgn}(-0+0+\ldots+(2)(1)) = \text{sgn}(2) = 1$$

In the case where X and Y are equal in their most significant bits, but Y is greater than X, all of the terms of equation (1) will be 0, the sign of which is equal to 1.

EXAMPLE OF THE COMPARISON FUNCTION

Assume that X and Y are each 3-bit numbers which are to be compared in a threshold logic circuit having the construction given in equation (1). Assume that X and Y have the values given in Table I, which also shows their corresponding values in the transformed binary set $[-1,1]$.

TABLE I

| | | |
|---|---|---|
| X = 101 | $-1 \; 1 \; -1$ | $= (x_2, x_1, x_0)$ |
| Y = 100 | $-1 \; 1 \; -1$ | $= (y_2, y_1, y_0)$ |

In this case, equation (1) requires three specific delta polynomials. Three such polynomials are given in equation (5), (6), and (7), wherein:

$$P(z_1 z_2 z_3) = \tfrac{1}{8}(1 + z_1 + z_2 + z_3 + z_1 z_2 + z_1 z_3 + z_2 z_3 + z_1 z_2 z_3) \quad (5)$$

$$P(z_1 z_2) = \tfrac{1}{4}(1 + z_1 + z_2 + z_1 z_2) \quad (6)$$

$$P(z_1) = \tfrac{1}{2}(1 + z_1) \quad (7)$$

Assume further that the following relationships hold.

$$z_1 = x_2 y_2$$

$$z_2 = x_1 y_1$$

$$z_3 = x_0 y_0$$

With equations (5)–(7) and with the relationships given above, equation (1) comes:

$$C(X, Y) = sgn(-P(x_2 y_2, x_1 y_1, x_0 y_0) + \quad (8)$$

$$(x_0 - y_0) P(x_2 y_2, x_1 y_1) + (x_1 y_1) P(x_2 y_2) + (x_2 - y_2)$$

Now, using the transformed values from Table I $x_2 y_2 = 1, x_1 y_1 = 1$, and $x_0 y_0 = -1$; placing these values in equations (8) yields:

$$C(X,Y) = sgn(\tfrac{1}{8}(1+1+1-1+1-1-1-1)+(-1-1-)\tfrac{1}{4}(1+1+1+1)+(1-1)(1+1)+(-1-(-1)))$$

which, with reduction yields:
$$C(X,Y) + sgn(\tfrac{1}{8}(0) - (2)\tfrac{1}{4}(4) + (0)(2) + 0)$$
$$C(X,Y = sgn(0-2+0+0) = -1,$$

which indicates that X is greater than Y, as inspection of Table I will confirm.

In constructing a depth-2 threshold logic circuit which will perform the COMPARISON function according to the structure implicit in equation (1), reference is given to equations (5)–(8) which give the necessary delta polynomials. The sparse polynomial for the COMPARISON of a 3-bit number is, using equations (5)–(8), given by:

$$sgn(-1/8 (1 + x_0 y_0 + x_1 y_1 + x_2 y_2 + x_0 y_0 x_1 y_1 + \quad (9)$$

$$x_0 y_0 x_2 y_2 + x_1 y_1 x_2 y_2 + x_0 y_0 x_1 y_1 x_2 y_2) +$$

$$1/4(x_0 y_0)(1 + x_1 y_1 + x_2 y_2 + x_1 y_1 x_2 y_2) +$$

$$1/2(x_1 - y_1)(1 + x_2 y_2) + (x_2 - y_2))$$

which, with multiplication of terms as indicated yields:

$$sgn(-1/8 (1 + x_0 y_0 + x_1 y_1 + x_2 y_2 + x_0 y_0 x_1 y_1 + \quad (10)$$

$$x_0 y_0 x_2 y_2 + x_1 y_1 x_2 y_2 + x_0 y_0 x_1 y_1 x_2 y_2) +$$

$$1/4(x_0 + x_0 x_1 y_1 + x_0 x_2 y_2 + x_0 x_1 y_1 x_2 y_2) -$$

$$1/4(y_0 + y_0 x_1 y_1 + y_0 x_2 y_2 + y_0 x_1 y_1, x_2 y_2) +$$

$$1/2(x_1 + x_1 x_2 y_2) - 1/2(y_1 + y_1 x_2 y_2) + (x_2 - y_2))$$

Figure 3:
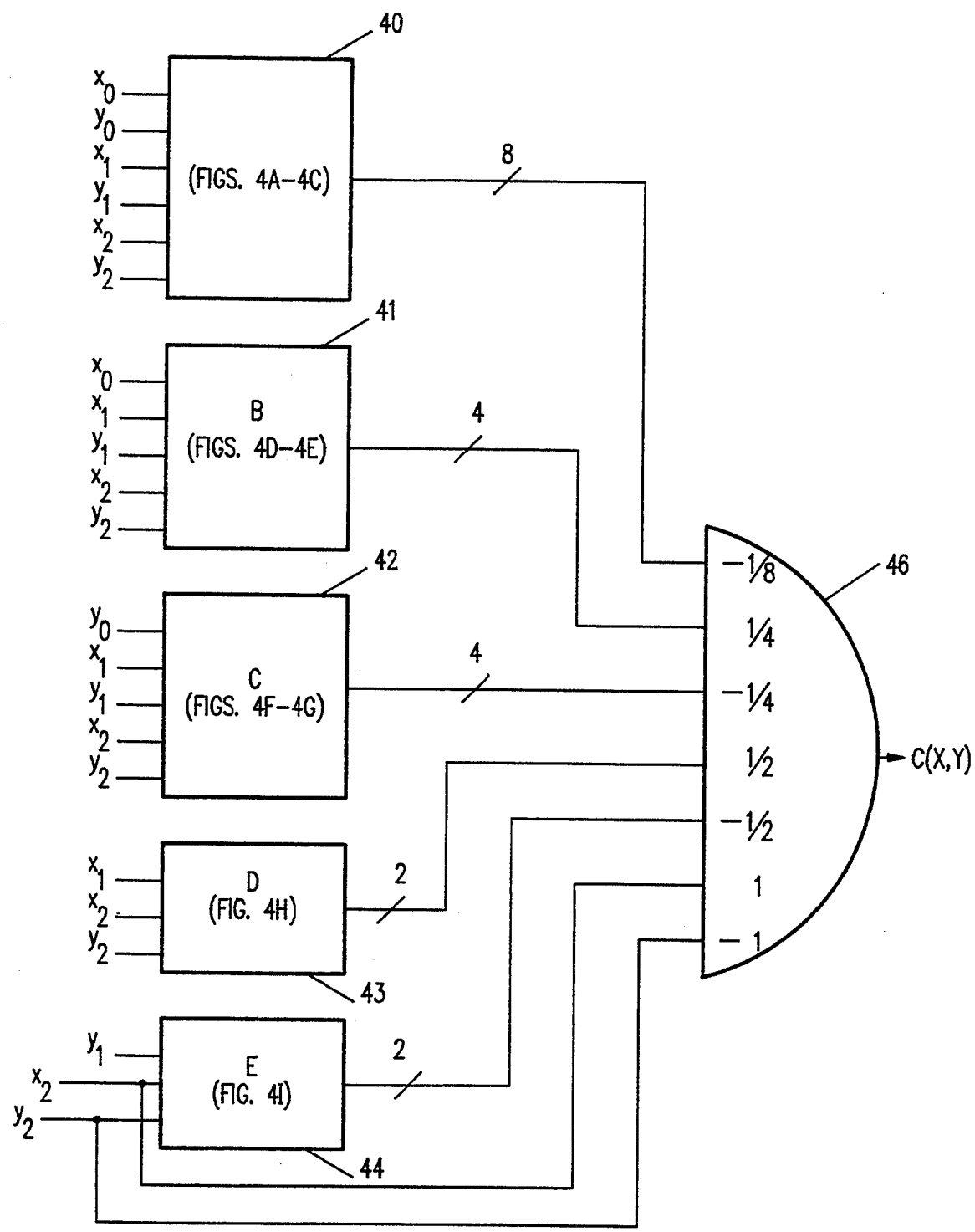
FIG. 3 is a logic diagram illustrating the implementation of the logical COMPARISON function according to the invention.
Figure 4A:
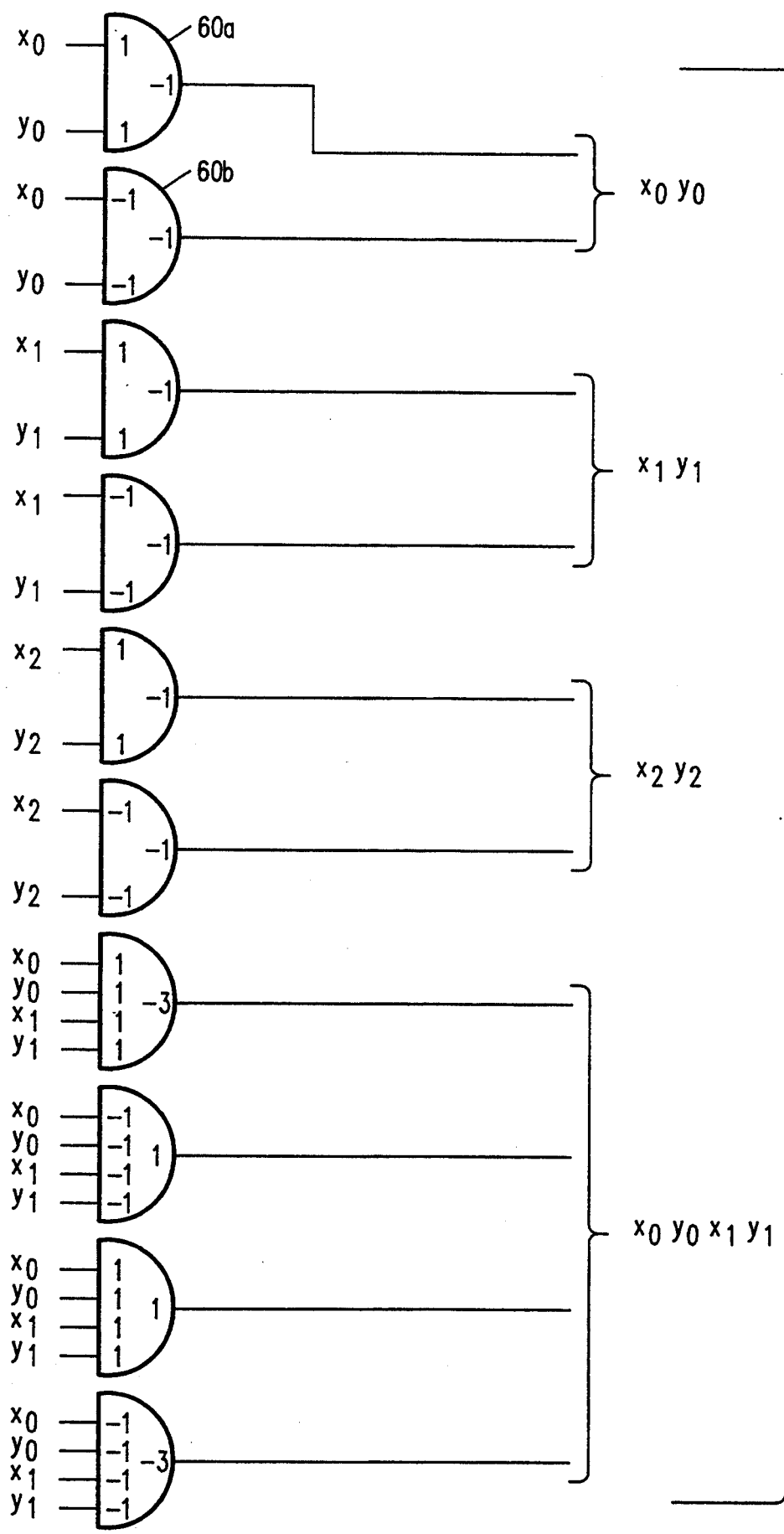
Figure 4B:
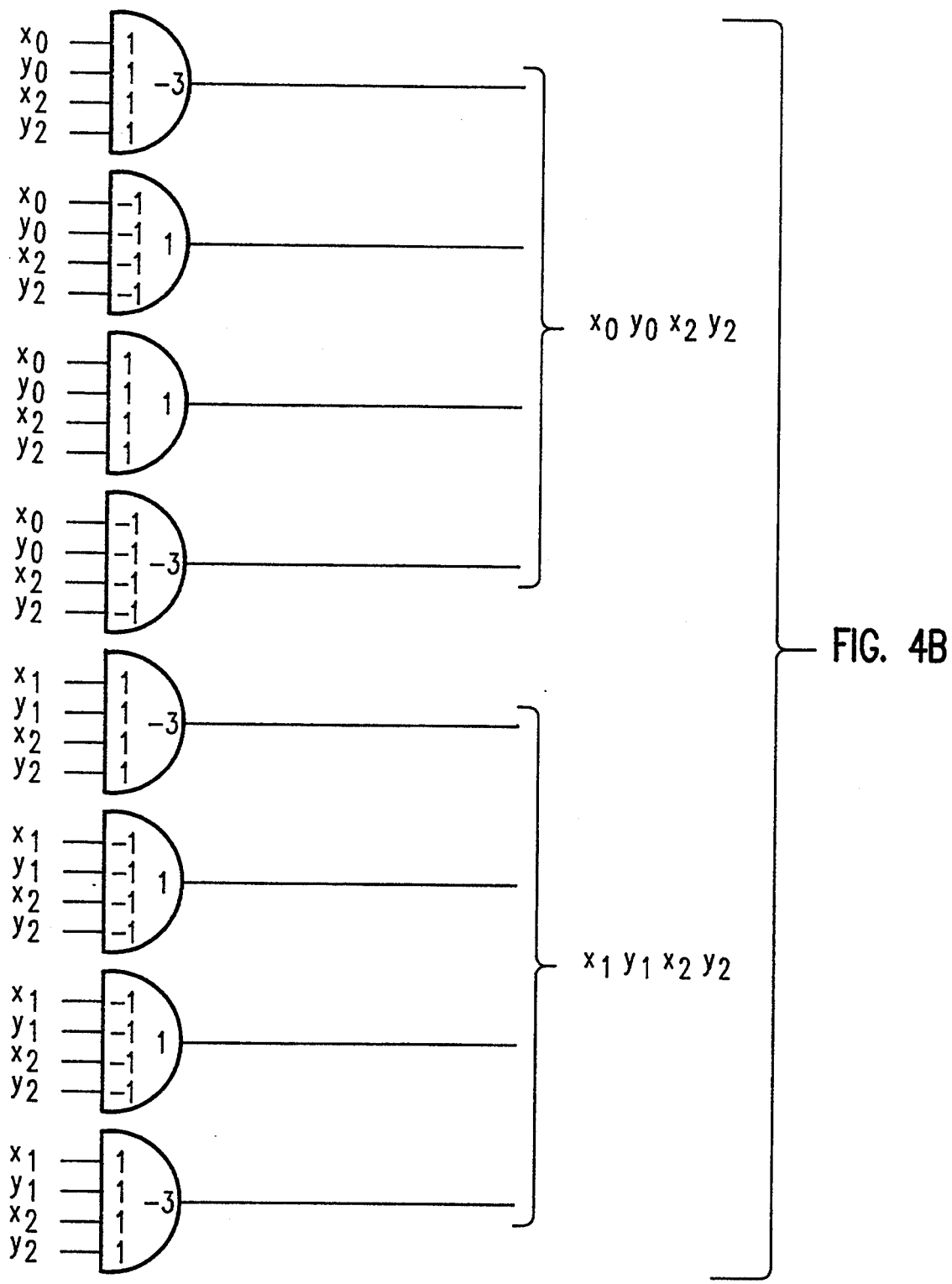
Figure 4C:
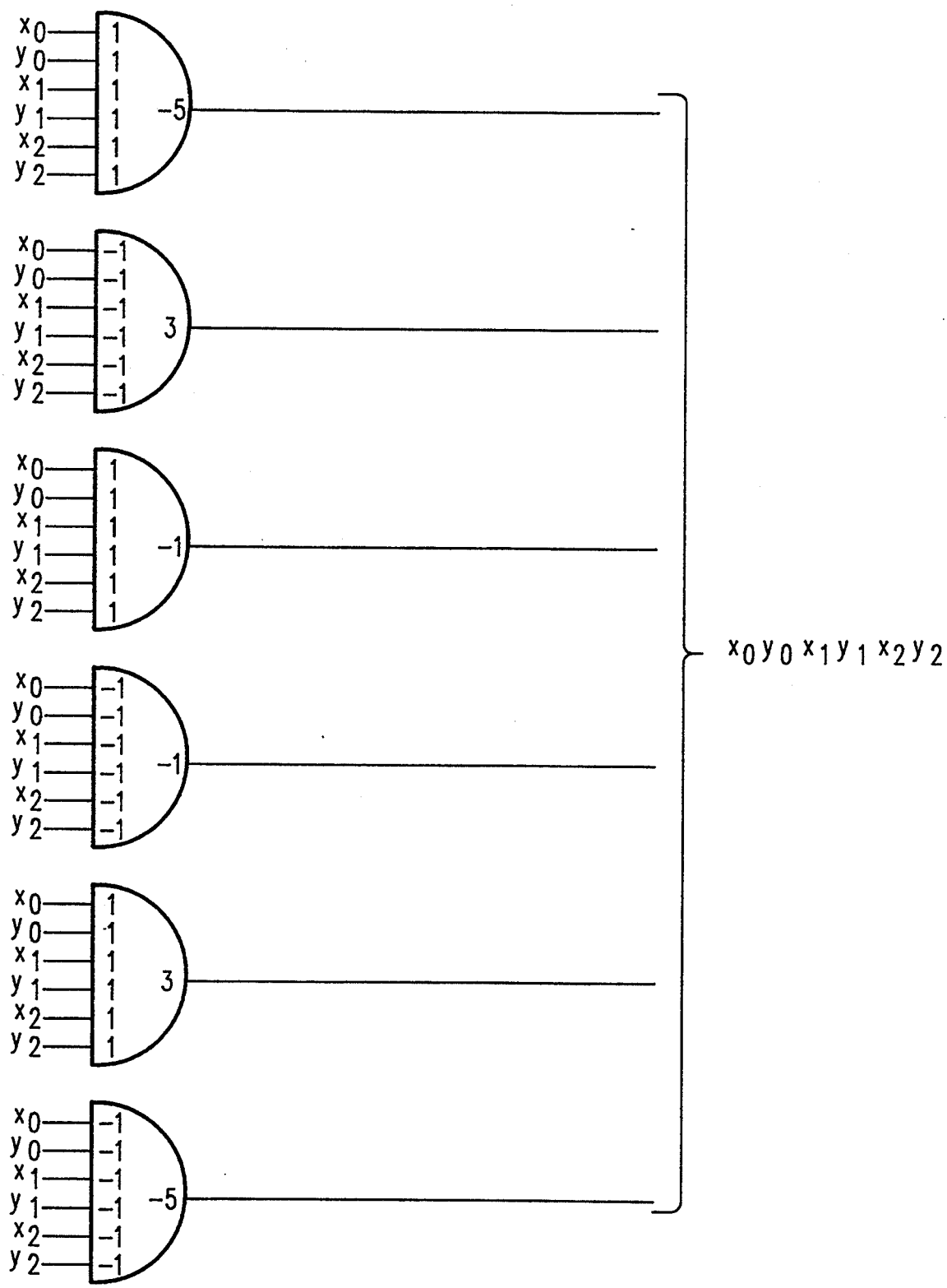
Figure 4D:
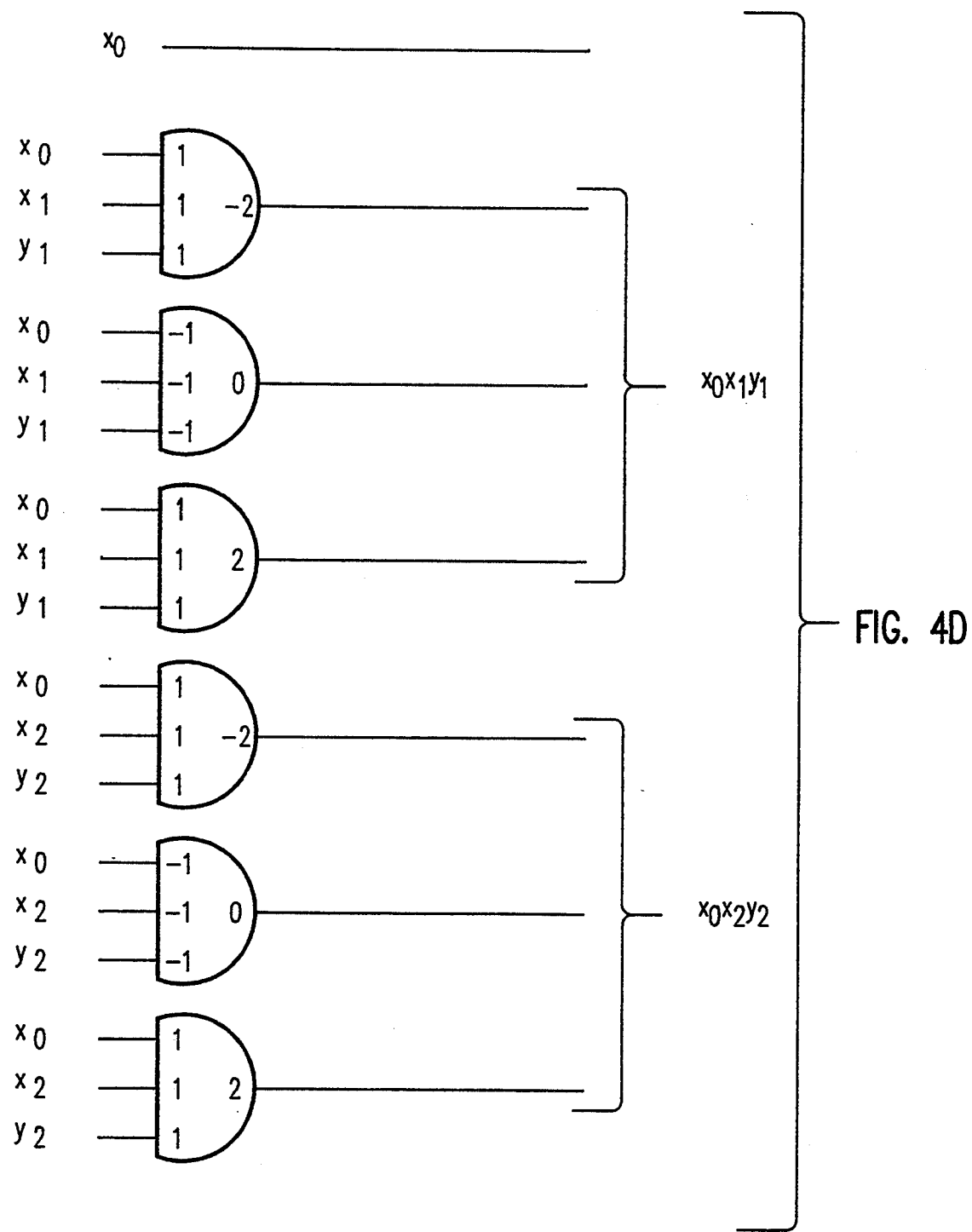
Figure 4E:
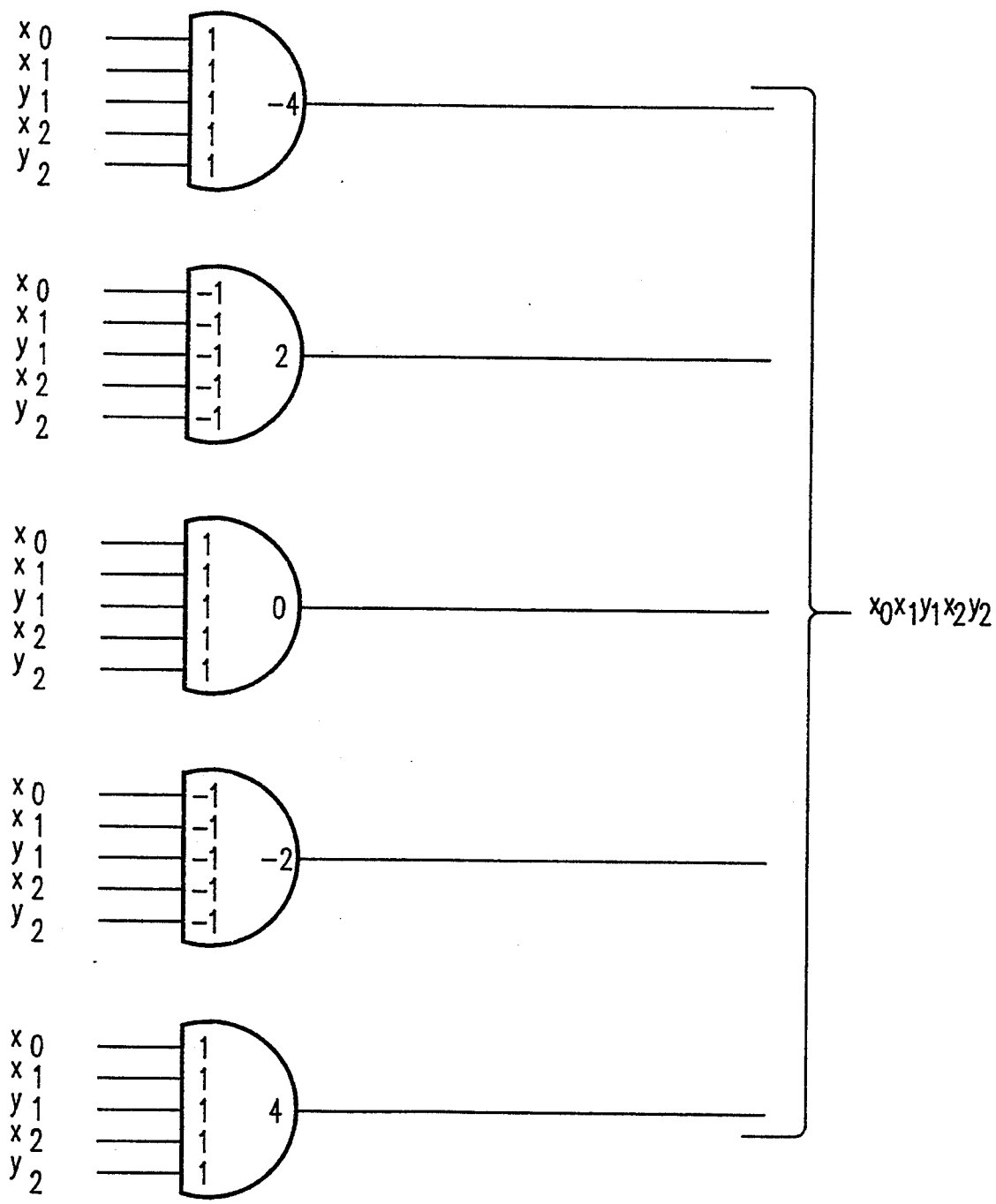
Figure 4G:
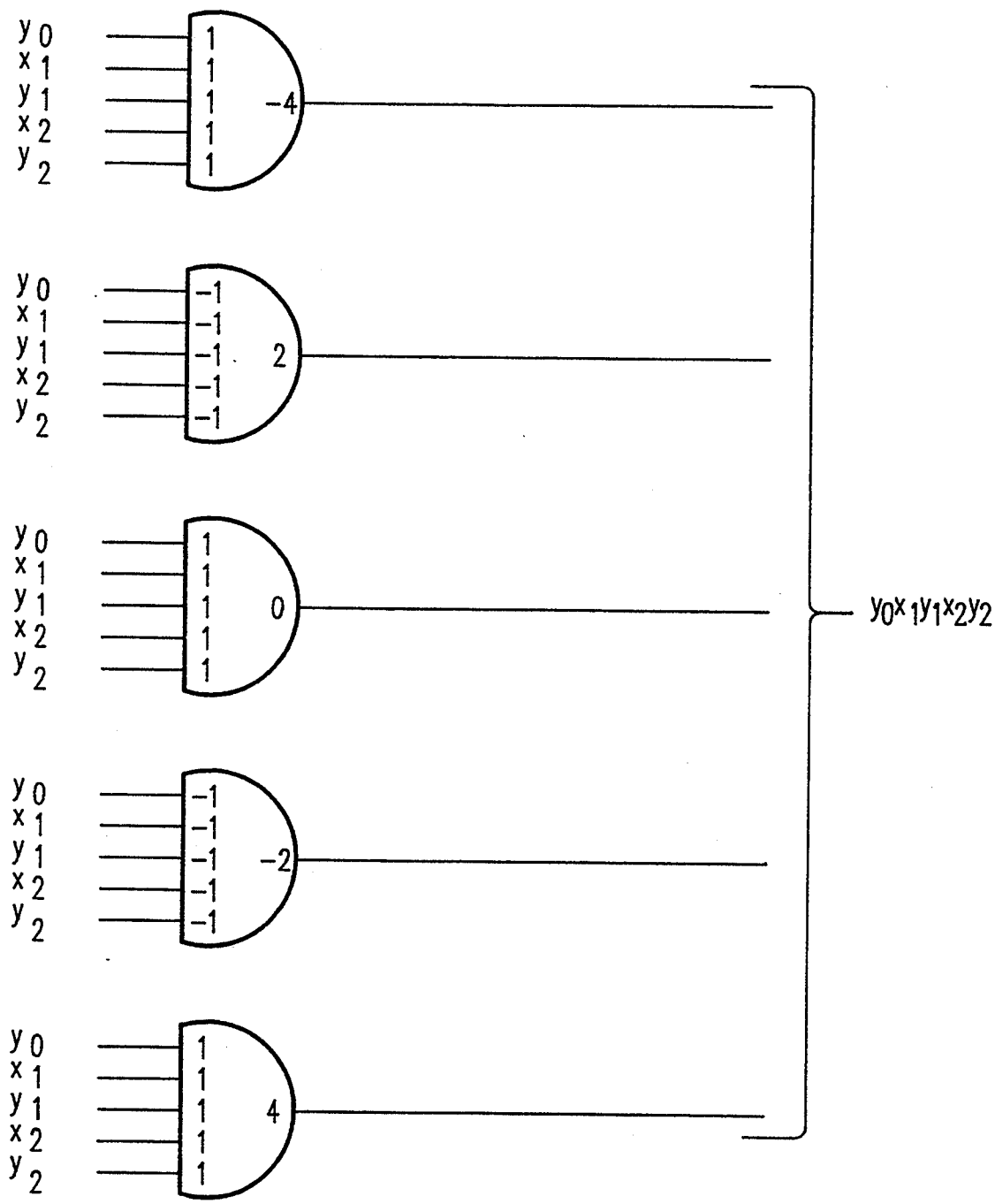
Figure 4H:
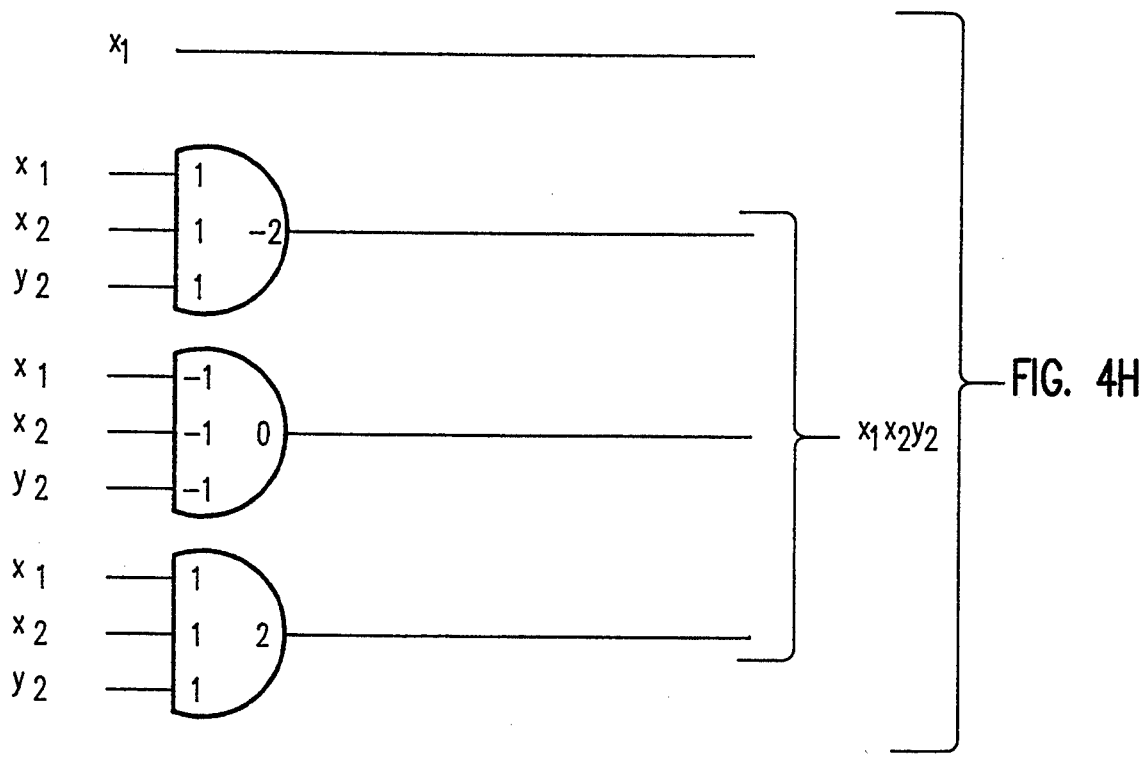
Figure 4I:
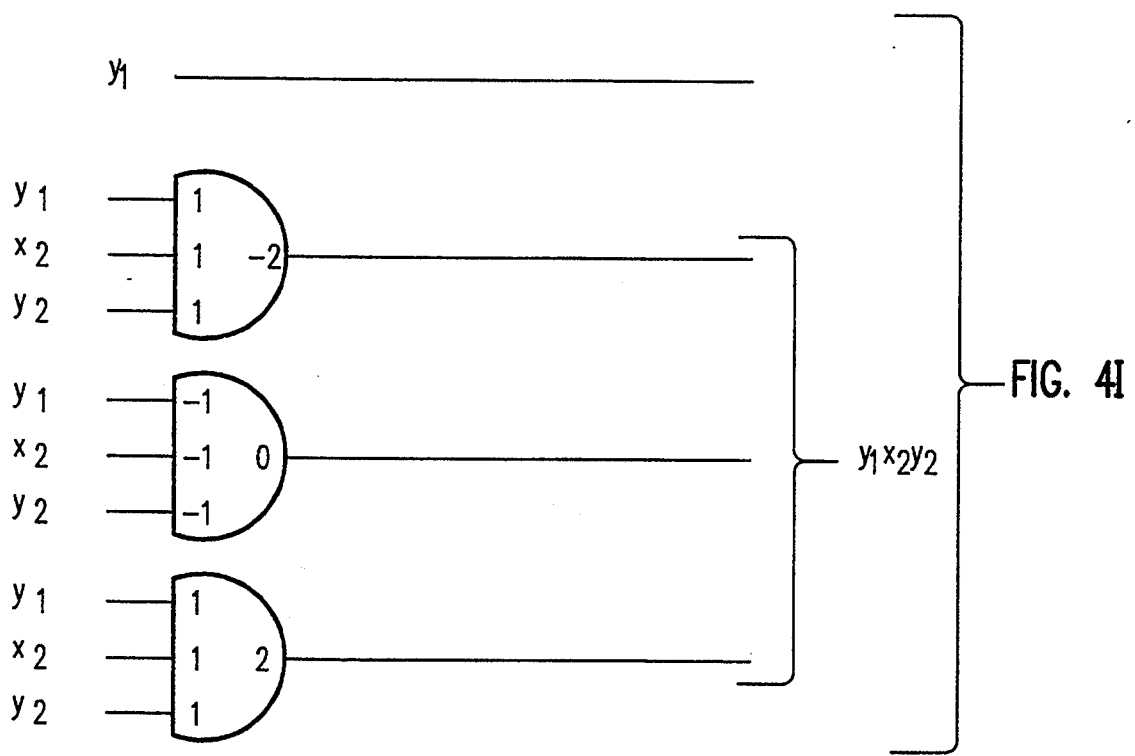

This sparse polynomial is implemented in the depth-2 threshold logic circuit of FIG. 3. In FIG. 3, the first delta polynomial enclosed in the parentheses multiplied by $-\tfrac{1}{8}$ is implemented in the block 40, which represents a group A of logic gates which are illustrated in FIGS. 4A–4C. Similarly, the block 41 corresponds to a group B of threshold logic gates which implement the monomials multiplied by $\tfrac{1}{4}$, the block 42 represents a group C of threshold logic gates which implement the monomials in the parentheses multiplied by $-\tfrac{1}{4}$, block 43 includes a group D of threshold logic gates which implement the monomials enclosed in the parentheses multiplied by $\tfrac{1}{2}$, and the block 44 represents a group E of threshold logic gates which implement the monomials enclosed in the parentheses multiplied by $-\tfrac{1}{2}$. The value by which each of the parentheses is multiplied represents a weight. Thus, each output of each of the blocks 40–44 is weighted by the value that multiplies the monomial to which it corresponds. The threshold logic gate 46 combines the weighted inputs and subjects them to the threshold value of 1. The output of the threshold logic gate 46 is a single binary signal indicating the output of the COMPARISON function in response to two 3-bit numbers.

FIGS. 4A–4I illustrate the threshold logic circuits which implement monomials of the delta polynomials defining the structure of the COMPARISON circuit of FIG. 3. For example, in FIG. 4A, the threshold logic gates 60a and 60b are necessary elements for generation of the term $x_0 y_0$ (See the discussion above respecting FIG. 2A). The remaining gates in FIG. 4A are bracketed to indicate the monomials to which they correspond.

INDUSTRIAL IMPLEMENTATION OF THE ADDITION FUNCTION

The arithmetic ADDITION function is implemented for two n-bit numbers, X and Y, by utilizing delta polynomials to construct a sparse polynomial which will compute the carry into each bit location. This can be understood with reference to FIG. 6.

Figure 6:
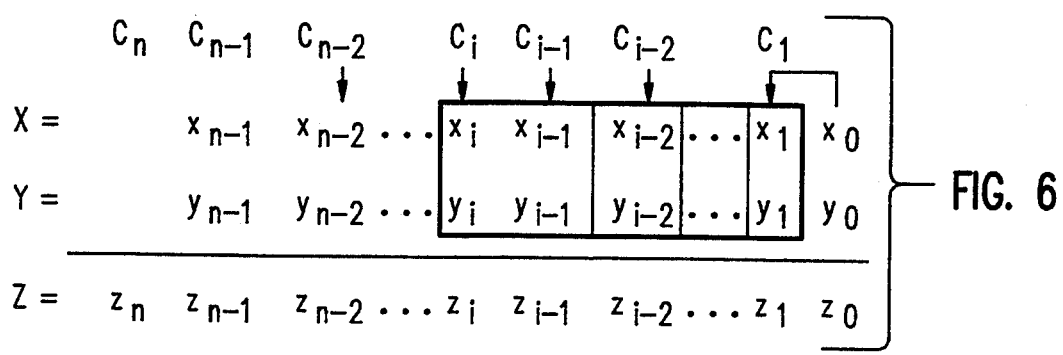
FIG. 6 shows how the delta polynomials implicit in the logic diagram of FIG. 5 test for carry generation and propagation.

In FIG. 6, two n-bit numbers, X and Y, are being added to produce a sum Z having n+1 bits. For each bit position of Z, the value can be computed using the corresponding bits of X and Y, and any carry which is generated and propagated to that bit position. Thus, for example, sum bit $z_i$ can be generated by combining the carry bit $c_i$ which is propagated to this position with the operand bits for the position, that is, bits $x_i$ and $Y_i$. In the invention, each bit of the sum Z is generated by a threshold logic circuit constructed according to a sparse polynomial which includes groups of gates corresponding to delta polynomials test the conditions necessary to determine whether a carry bit is generated and propagated to the position for which a sum bit is being generated.

In the discussion following, it is assumed that when the carry is active, it has the transform value $-1$ (which corresponds to a logical 1) and when inactive, it has the transform value 1 (which corresponds to a logical 0).

Thus, for sum bit position i, it must be determined whether a carry is generated in a less significant bit position and whether that carry is propagated through the intervening positions to bit position i. In this case, if there is some bit position, say, bit position k where $x_k = y_k = -1$ (logical 1) such that k is less than i and greater than or equal to 0, and for every $x_j$ and $y_j$, $x_j$ does not equal $y_j$, where j is less than i and greater than k, the carry into bit position i is active. Manifestly, every bit string between bit position i and bit position 0 must be tested for these two conditions. This can be understood with reference to FIG. 6 where, for example, the carry $c_i$ can be generated at bit position 0 if $x_0 = y_0$ and propagated to bit position i only if x is not equal to y at every bit position beginning with bit position 1 and ending with bit position $i-1$. Thus, this 2-pronged test must be performed for each of $i-1$ bit strings between bit position 0 and bit position i.

The construction of depth-2 threshold logic circuit for determining the carry bit $c_i$ is given by the following equations:

$$\text{carry}_i(X, Y) = \text{sgn}\left(1 - \sum_{j=0}^{i-1} f(x_j, y_j) L_j(X, Y)\right) \quad (11)$$

$$f(x_j, y_j) = \begin{cases} 4 & \text{if } x_j = y_j = -1 \\ 0, & \text{otherwise} \end{cases} \quad (12)$$

$$L_j = P(-x_{i-1}y_{i-1}, -x_{i-2}y_{i-2}, \ldots, -x_{j+1}y_{j+1}) \quad (13)$$

In equation (11), the function $f(x_j,y_j)$ tests whether a carry is generated at bit position j, while the delta polynomial of equation $L_j$ tests whether a carry is propagated from bit position j to bit position i through the intervening bit positions, that is, bit position $j+1$ through bit position $i-1$. Equations (12) and (13) give respective implementations for the f and L terms of equation (11).

With regard to equations (11)–(13), if a carry is generated at bit position j, the function has the value of 4. As explained above, the delta polynomial $L_j$ is selected such that it exhibits a relatively large value when its monomials all have the value of 1. This would occur only in the case that x did not equal y in every bit position between bit positions $j+1$ and $i-1$. In this case, the product of the bits at those positions would be $-1$ (in the transform set of values) and, as equation (13) indicates the sign is inverted, which will result in the occurrence of the "delta" condition, that is, $L_j=(1,1,\ldots,1)$. Assuming that the delta polynomial has a value of 1 in this case the product of the function f and the polynomial L is 4. Now equation (11) reduces to: sgn $(1-4)=(-3)=-1$.

In the case where a carry is generated at bit position j, but not propagated, the delta polynomial $L_j$ will have a value of 0, resulting in a product of 0. Similarly, if the delta polynomial $L_j$ indicates that a carry can be propagated from bit position j to bit position i, but no carry is generated at bit position j, the function will have a value of 0, resulting in a product of 0. In both cases, equation (11) will produce a value of 1 indicating that the carry into bit position i is 0.

Figure 5:
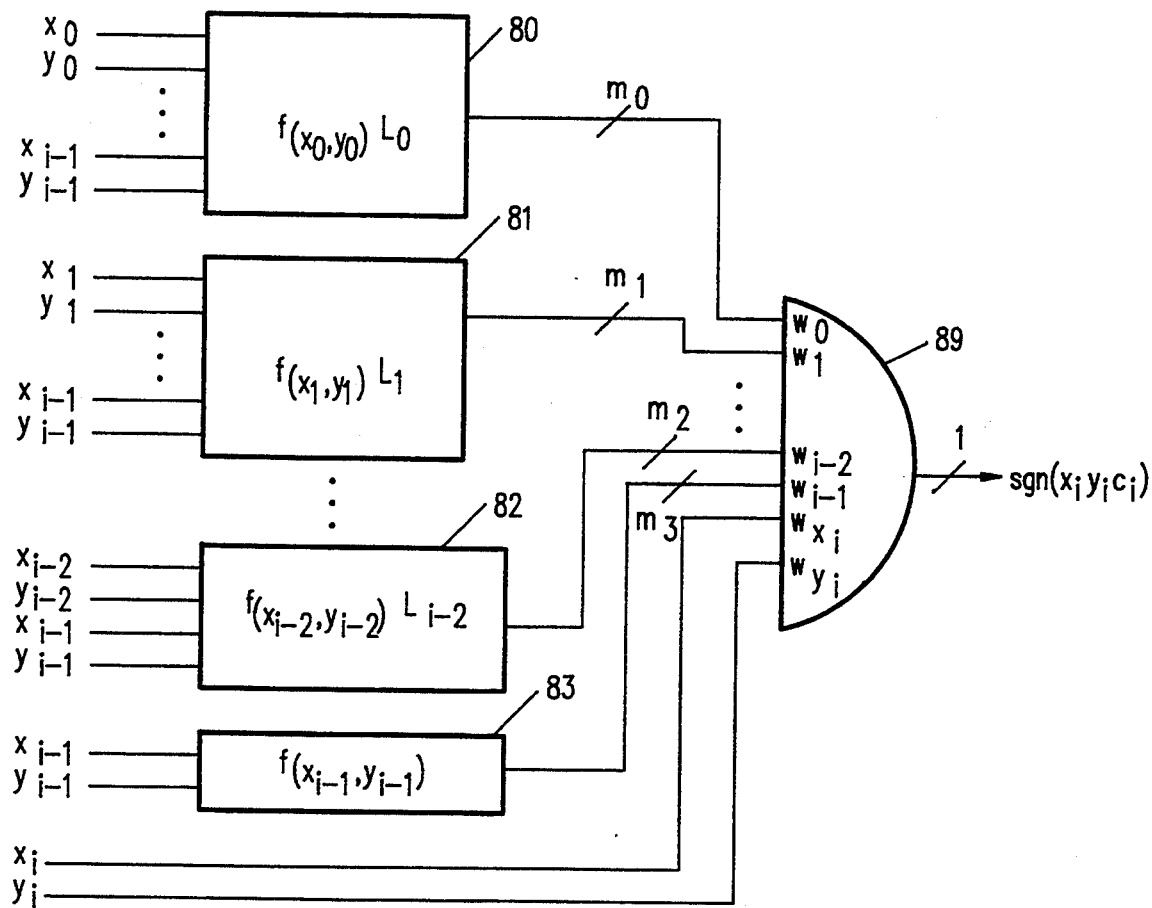
FIG. 5 is a logic diagram illustrating an implementation of an arithmetic ADD function according to the invention.

A circuit for generating the sum bit at bit position i is illustrated in FIG. 5. The circuit is a threshold logic circuit of depth-2 in which a first level includes a plurality of groups of threshold logic gates, with four of the groups being indicated by reference numerals 80, 81, 82, and 83. Each of the groups of logic gates tests for carry generation and propagation from a particular bit position up to bit position i. Thus, for example, the threshold logic gates included in the block 80 test for carry generation at bit position 0 and carry propagation from bit position 1 through bit position $i-1$. The type and construction of the gates included in the group 80 are derived in the manner described above for the COMPARISON threshold logic circuit by first multiplying the delta polynomial $L_0$ by the terms of a delta polynomial implementing the function $f(x_0y_0)$. One such polynomial is $f=(1-x_j-y_j+x_jy_j)$. The product will give a polynomial including a plurality of monomials which are implemented in threshold gates according to known techniques. The resulting plurality of gates inherently provides the monomials resulting from the product of the delta functions which label the group 80. All of the other groups which test carry generations/propagation, including the groups 81 and 82 are similarly constructed. The construction of the gate group 83 assumes that the polynomial $L_{i-1}$ has a value of 1 and simply tests whether a carry is generated at the next least bit position following bit position i.

The threshold logic gate 89 in the second level of the circuit of FIG. 5 combines the monomial terms produced by the gate groups including the groups 80, 81, 82, and 83 with the values for the bits $x_i$ and $y_i$, tests the combination against a threshold value $T=1$, and outputs a single signal corresponding to the sign function of $x_iy_ic_i$. This output, of course, is equivalent to the value of the sum bit $z_i$.

GENERATION OF SPARSE DELTA POLYNOMIALS

The inventors have discovered that sparse delta polynomials can be generated utilizing generator matrices which produce linear error-correcting codes. In this regard, such a matrix includes a 2-dimensional matrix whose horizontal dimension corresponds to the number of monomials in a delta polynomial and whose vertical dimension corresponds to the highest number of variables for any monomial of the polynomial. Error-correcting codes are known. Also known is that error-correcting codes are characterized by minimum and maximum distances (also called "weights"). Relatedly, the minimum distance is the minimum number of ones which are generated by multiplying a vector times the generator matrix, while the maximum distance is the maximum number of ones obtained thereby. If a polynomial with n monomials is generated from an error-correcting code having a length of n, then the polynomial is a delta polynomial if the maximum and minimum weights are approximately equal to (n/2). A known method for creating error correcting codes with minimum and maximum weight which are approximately equal to n/2 is referred to in the discussion on character sums and delta polynomials presented above.

An unexpected benefit of the method of generating delta polynomials with a generator matrix is that the resulting expressions have the attributes of sparseness and low coefficient values discussed above.

Generation of a delta polynomial from an generator matrix is illustrated in FIG. 7A, and the resulting delta polynomial is illustrated in FIG. 7B. In FIG. 7A, the matrix has a length (1) equal to 8 and depth (d) equal to 3. If the matrix is multiplied by a vector $(x_1,x_2,x_3)$, it will generate an code of size 8 including one all-0 vector and 7 non-zero vectors, each of which includes 4 ones. Thus, the minimum weight $(w_{min})$ and the maximum weight $(w_{max})$ both equal 4, which is equivalent to n/2. This satisfies the condition for generating a delta polynomial from the matrix. Generation of the delta polynomial of FIG. 7B is illustrated in FIG. 7A where each column of the generator matrix is used to produce a respective monomial of the delta polynomial. Thus, the maximum number of variables of any monomial is three and the variables of a monomial are $x_3$, $x_2$, and $x_1$. Each monomial variable corresponds to the same respective row position in each column as illustrated in FIG. 7A.

Thus, for example, for each monomial, row position 3 in each column corresponds to the variable $x_3$, row position 2 to variable $x_2$ and row position 1 to variable $x_1$. To obtain a variable from a column, each variable is raised to the power corresponding to the row/column position which it occupies in the column. The position indicator in each case is $g_{rc}$. So, in column 1, $x_1$ is raised to the power of the matrix value at position $g_{11}$, which is 0. Similarly, with zeros in row positions 2 and 3, $x_2$ and $x_3$ are both raised to the 0 power. The product of the three variables raised to the 0 power is 1, as indicated in FIG. 7A. The second monomial is derived in this manner from the second column with the result that $x_1$ and $x_2$ are both raised to the 0 power, while the 1 in matrix position $g_{32}$ raises $x_3$ to the first power, thereby producing the monomial $x_3$ for the second term. The terms for the remaining columns are illustrated in FIG. 7A. The monomials generated for the terms are concatenated as illustrated in FIG. 7B to yield the illustrated delta polynomial.

Figure 8A:
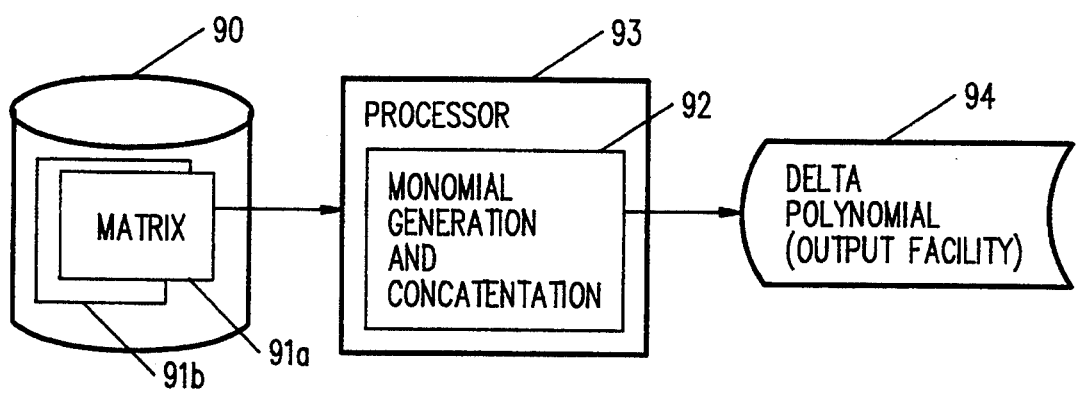
FIGS. 8A and 8B illustrate a machine-implemented procedure for generating a delta polynomial from a linear error-correcting generator matrix.
Figure 8B:
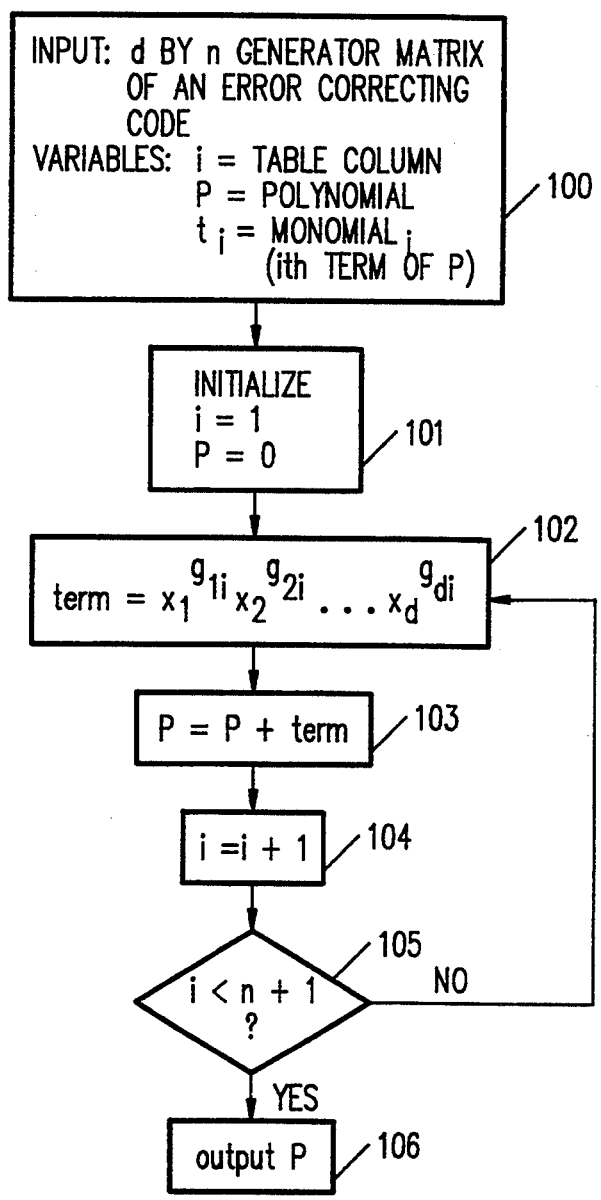

FIGS. 8A and 8B illustrate an automated means for generating a delta polynomial using a code generator matrix. In FIG. 8A, an on-line direct access storage device (DASD) 90 stores a plurality of generator matrices, two of which are indicated by 91a and 91b. The generator matrices are, preferably, error-correcting code generator matrices of varying dimensions. A process 92 for generation and concatenation of monomials exists in the form a software program which is executable on a processor 93. The processor 93 can comprise any of a number of programmable scientific tools, such as the PS/2 personal computer available from the Assignee. The software program 92 can be prepared in any language which is executable on the processor 93 and which can obtain access to the generator matrices 91 and 92 on the DASD 90. For example, a C language program can be written, compiled, and executed using the processor 93. The program 92 selects a generator matrix, operates on it in the manner illustrated in FIG. 7A to generate a delta polynomial such as that illustrated in FIG. 7B, and outputs the delta polynomial on an output device 94.

A flow diagram illustrating the monomial generation and polynomial assembly program 92 is presented in FIG. 8B. In FIG. 8B, the program is initiated by defining variables i, P, and $t_i$. The variable i defines the current matrix column, the variable P the delta polynomial which is being constructed, and the variable $t_i$, the ith term of the polynomial P. A generator matrix can be directly input to the procedure of FIG. 8B. Alternatively, the matrix can be defined dimensionally by inputing values for the dimensions d and l, after which the program acquires a matrix with these dimensions. Once the matrix is identified, the program initiates by initializing P to 0 and i to 1 in step 101, and then building the first term of the polynomial P in step 102. The term is built as illustrated in FIG. 7A. In this regard, when the column is identified, the program increments through the row positions of the identified column, and at each row position, assigns an exponent to the corresponding variable according to the value at the row position. Once the monomial is built, it is appended (by addition) to the polynomial P in step 103, the column index i is incremented in step 104, and the incremented column index is compared to the breadth of the generator matrix in step 105. The polynomial P is built in the real memory of the processor 93. So long as the last column has not been reached in the generator matrix, the negative exit is taken from decision 105, the next term is built, appended to the polynomial P, and so on. Once all of the columns of the generator matrix have been accessed, the positive output is taken from the decision 105 and the delta polynomial P is output from the processor to the operator in step 106.

Throughout the disclosure given above, delta polynomials and specific threshold logic gate constructions have been given in terms of a transformed set of binary values $[-1,1]$. Those skilled in the art will appreciate the fact that a number of circuit technologies exist which can effectively transform between this set and the binary set [1,0], and which can perform the operations required for the comparison and addition threshold logic circuits as described above using the transformed set. In addition to this consideration, those skilled in the art will appreciate that many other modifications and variations of the invention can be implemented as required by design considerations without departing from the spirit and scope of the appended claims.

We claim:
1. A threshold logic circuit for combining two n-bit words $X = x_{n-1} \ldots x_0$ and $Y = y_{n-1} \ldots y_0$ according to a logic or arithmetic function, comprising:

in a first gating level, a plurality of first threshold logic gate means, respective groups of the first threshold logic gate means corresponding to respective delta polynomials, each threshold logic gate means in each group responsive to a respective combination of bits of X and Y for producing an output indicative of a value of a respective term in a delta polynomial function, each delta polynomial function producing a large absolute value for a single set of variable values and relatively small absolute values for all other sets of variable values; and in a second gating level, a second threshold logic gate means connected to the plurality of first logic gate means for generating an output indicative of the sign function of a polynomial including the weighted sum of all of the delta polynomials.

2. The threshold logic circuit of claim 1 wherein the logic function is the COMPARISON function, and:

a first group of first threshold logic gate means is for producing outputs corresponding to the monomials of a delta polynomial $M_{-1}(X,Y) = P(X_{n-1}, \ldots, x_0 y_0)$ which tests each pair of corresponding bits in X and Y and which assumes a relatively large value if the bits of each pair are equal and a relatively small value if the bits of any pair are unequal;

a plurality (k) of second groups of first gate means is each for producing outputs corresponding to monomials of a function including a delta polynomial $M_i(X, Y) = P(x_{n-1} y_{n-1}, \ldots, x_{i+1} y_{i+1})$ where, for a bit position, the delta polynomial tests every pair of corresponding bits at bit positions $i+1$ through $n-1$ and assumes a value of 1 if the bits of each pair of corresponding bits are equal and a value of 0 if the bits of any pair are unequal, the function being: $(x_i - y_i) M_i(X, Y)$; and the second threshold logic gate means generates an output C(X, Y) indicative of the sign function of a polynomial given by:

$$C(X, Y) = \text{sgn}\left(-m_{-1}(X, Y) + \sum_{i=0}^{n-1}(x_i - y_i)m_i(X, Y)\right).$$

3. The threshold logic circuit of claim 1, wherein the arithmetic function is the ADDITION function, and:
each group is for producing an output corresponding to the monomials of a function including a delta polynomial:

$$L_j = P(-x_{i-1}y_{i-1}, -x_{i-2}y_{i-2}, \ldots, -x_{j+1}y_{j+1})$$

where, for a bit position $j < i \leq n-1$, the delta polynomial tests every pair of corresponding bits at bit positions $j+1$ through $i-1$ and assumes a relatively large value if the bits of each pair of corresponding bits are unequal and a relatively small value if the bits of any pair are equal, the function being $f(X_jY_j)L_j(X<Y)$, where $f(x_jy_j)$ is equal to 4 if $x_j = y_j = -1$ and 0 otherwise; and
the second threshold gate means generates an output indicative of the sign function of a polynomial given by:

$$z_i = \text{sgn}(x_i y_i c_i)$$

where $z_i$ is the ith bit of the sum Z of X and Y $x_i$ and $Y_i$ are the ith bits of X and Y, respectively, and $c_i$ is the carry into the ith positions of X and Y, and:

$$C_i = \text{sgn}\left(1 - \sum_{j=0}^{i} f(x_j y_j)L_j(X, Y)\right).$$

4. A procedure for configuring a depth-two threshold logic circuit using a sparse delta polynomial the depth-two threshold logic circuit combining two n-bit words $X = x_{n-1} \ldots x_0$ and $Y = y_{n-1} \ldots y_0$ according to a logic or arithmetic function and including at least a first gating level with a plurality of first threshold logic gate means, respective groups of the first threshold logic gate means corresponding with a plurality of first threshold logic gate means, respective groups of the first threshold logic gate means corresponding to respective deltapolynomials, each threshold logic gate means in each group responsive to a respective combination of bits of X and Y for producing an output indicative of a value of a respective term in a deltapolynomial function, each deltapolynomial function producing a large absolute value for a single set of variable values and relatively small absolute values for all other sets of variable values and a second gating level with a second threshold logic gate means connected to the plurality of first logic gate means for generating an output indicative of the sign function of a polynomial including the weighted sum of all the deltapolynomials, the procedure executed on a computing machine that includes data storage, a central processing unit with associated working memory, and output facilities, the procedure including the steps of:
a) selecting from the data storage a matrix for generating a binary error-correcting code and entering the matrix into the central processing unit;
b) in the central processing unit,
1) defining respective variable positions that correspond to respective rows in the matrix;
2) for each column of the matrix, producing a term including variables at the respective variable positions, each variable being raised to a power having a value equal to a matrix value at a matrix location given by the row that corresponds to the variable and the column for which the term is produced;
c) generating a sparse delta polynomial by adding together the terms produced in step b.2); and
d) configuring a first threshold logic gate means according to the sparse deltapolynomial generated in step c).

* * * * *

UNITED STATES PATENT AND TRADEMARK OFFICE
CERTIFICATE OF CORRECTION

PATENT NO. : 5,357,528
DATED : October 18, 1994
INVENTOR(S) : Alon et al

It is certified that error appears in the above-indentified patent and that said Letters Patent is hereby corrected as shown below:

Column 18, line 50, please change "$P(X_{n-1}, ...$" to --$P(x_{n-1}y_{n-1}, ...$--

Column 19, line 33, please change "$\sum_{j=0}^{i}$" to --$\sum_{j=0}^{i-1}$--.

Signed and Sealed this

Eighth Day of August, 1995

Attest:

BRUCE LEHMAN

Attesting Officer

Commissioner of Patents and Trademarks